US012431824B2

(12) United States Patent
Kurosawa et al.

(10) Patent No.: US 12,431,824 B2
(45) Date of Patent: Sep. 30, 2025

(54) SEMICONDUCTOR DEVICE, MOTOR DRIVE SYSTEM, AND CONTROL METHOD THEREOF

(71) Applicant: Renesas Electronics Corporation, Tokyo (JP)

(72) Inventors: Minoru Kurosawa, Tokyo (JP); Satoshi Narumi, Tokyo (JP); Takeshi Ohtsuki, Tokyo (JP)

(73) Assignee: Renesas Electronics Corporation, Tokyo (JP)

( * ) Notice: Subject to any disclaimer, the term of this patent is extended or adjusted under 35 U.S.C. 154(b) by 93 days.

(21) Appl. No.: 18/089,281

(22) Filed: Dec. 27, 2022

(65) Prior Publication Data

US 2023/0238902 A1 Jul. 27, 2023

(30) Foreign Application Priority Data

Jan. 21, 2022 (JP) ................... 2022-008009

(51) Int. Cl.
*H02P 6/18* (2016.01)
(52) U.S. Cl.
CPC .................... *H02P 6/186* (2013.01)
(58) Field of Classification Search
CPC ........................................ H02P 6/186
USPC ..................................... 318/400.32
See application file for complete search history.

(56) References Cited

U.S. PATENT DOCUMENTS

| 5,907,225 A | 5/1999 | Kim |
| 7,176,677 B2 | 2/2007 | Narumi et al. |
| 10,199,974 B2 * | 2/2019 | Yoshiya ............ H02P 27/06 |
| 11,114,962 B2 | 9/2021 | Narumi |
| 2016/0087567 A1 * | 3/2016 | Thomas ............ H02P 27/08 318/767 |

(Continued)

FOREIGN PATENT DOCUMENTS

| JP | H01175385 A | 7/1989 |
| JP | 4684763 B2 | 5/2011 |

(Continued)

OTHER PUBLICATIONS

Decision of Rejection dated Feb. 4, 2025 received in Japanese Patent Application No. 2022-008009.

*Primary Examiner* — Kawing Chan
(74) *Attorney, Agent, or Firm* — SCULLY, SCOTT, MURPHY & PRESSER, P.C.

(57) ABSTRACT

The semiconductor device includes: a current detection circuit configured to detect a current flowing through a three-phase motor by driving of a drive circuit; and a controller configured to control the drive circuit, based on the detected current. The controller is configured to control, when the three-phase motor is stationary, an energization pattern in such a way that a wave detection current sequentially flows from the drive circuit to each phase of the three-phase motor, to obtain, from the wave detection current detected by the current detection circuit, a first, a second and a third interphase current differences, each of which is a difference among wave detection currents flowing in directions opposite to one another, to determine the energization pattern based on a magnitude relationship among the first, the second and the third interphase current differences.

5 Claims, 21 Drawing Sheets

(56) References Cited

U.S. PATENT DOCUMENTS

2016/0087568 A1* 3/2016 Thomas .................. H02P 25/03
　　　　　　　　　　　　　　　　　　　　318/400.02

FOREIGN PATENT DOCUMENTS

| JP | 2015211523 A | * | 11/2015 |
| JP | 2019187154 A |   | 10/2019 |

* cited by examiner

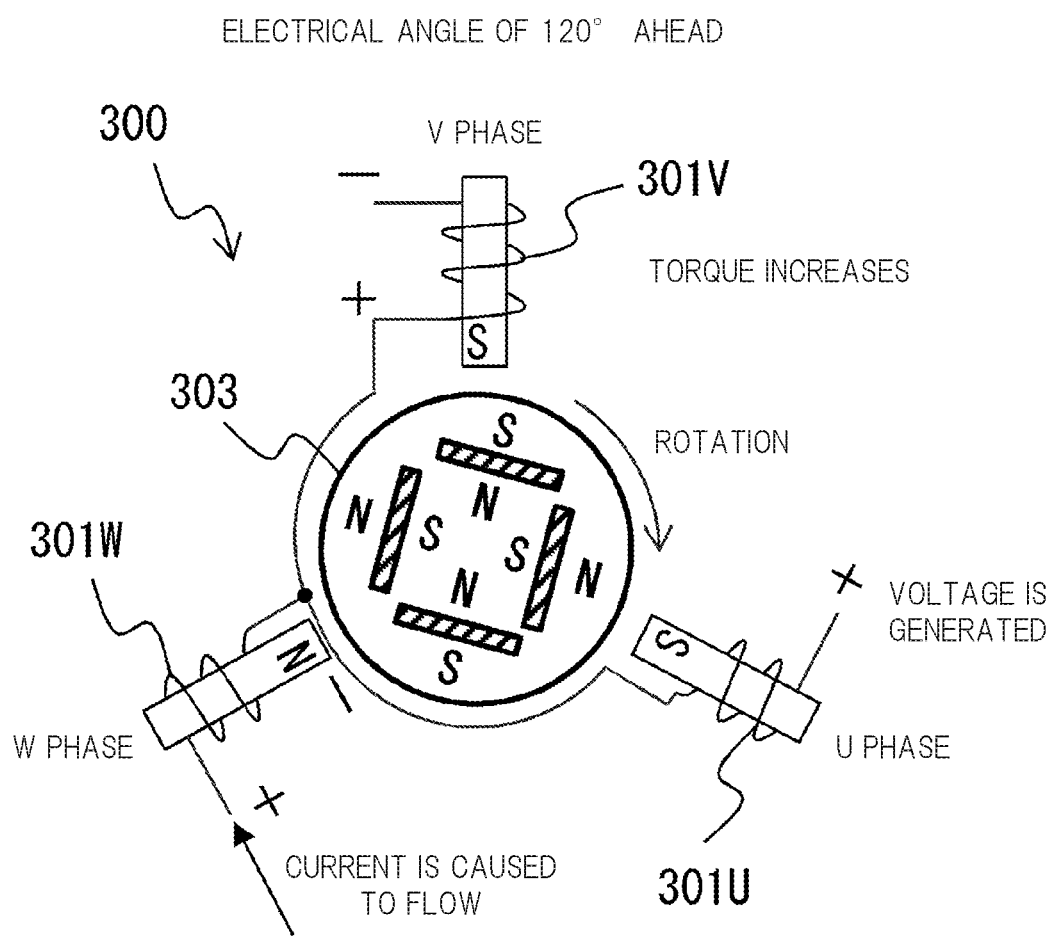

ELECTRICAL ANGLE OF 0°
(MAGNETIC EXCITATION POSITION AND TORQUE OF 0)

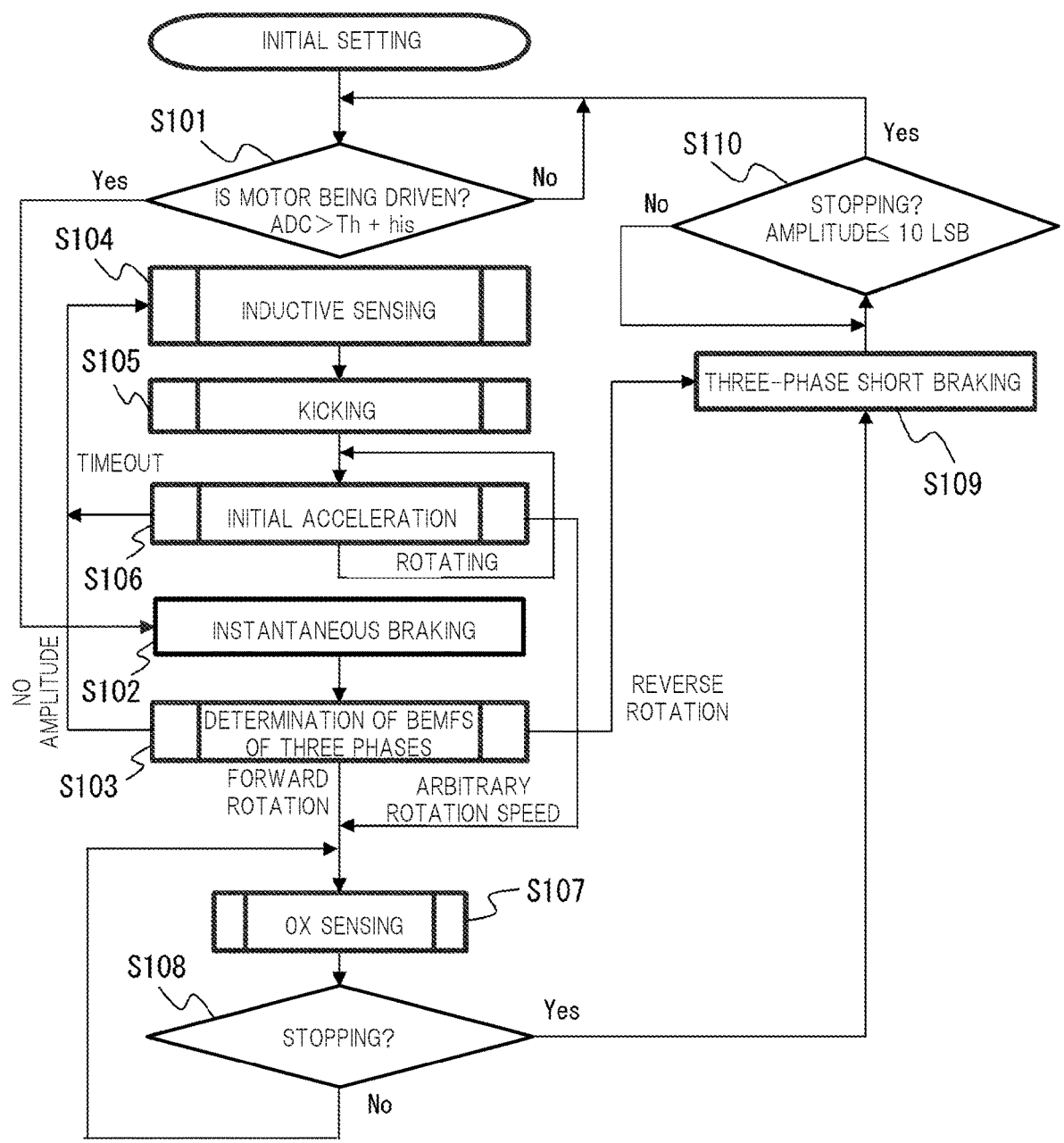

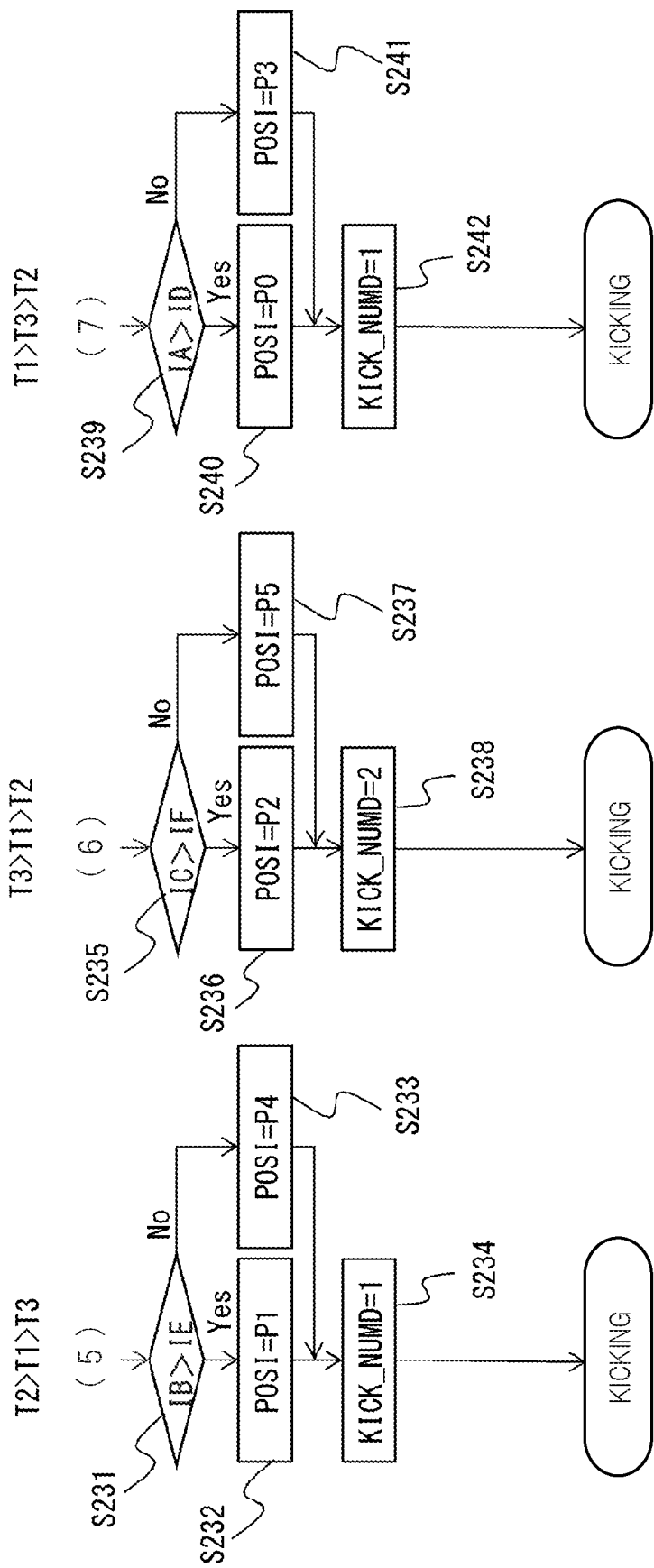

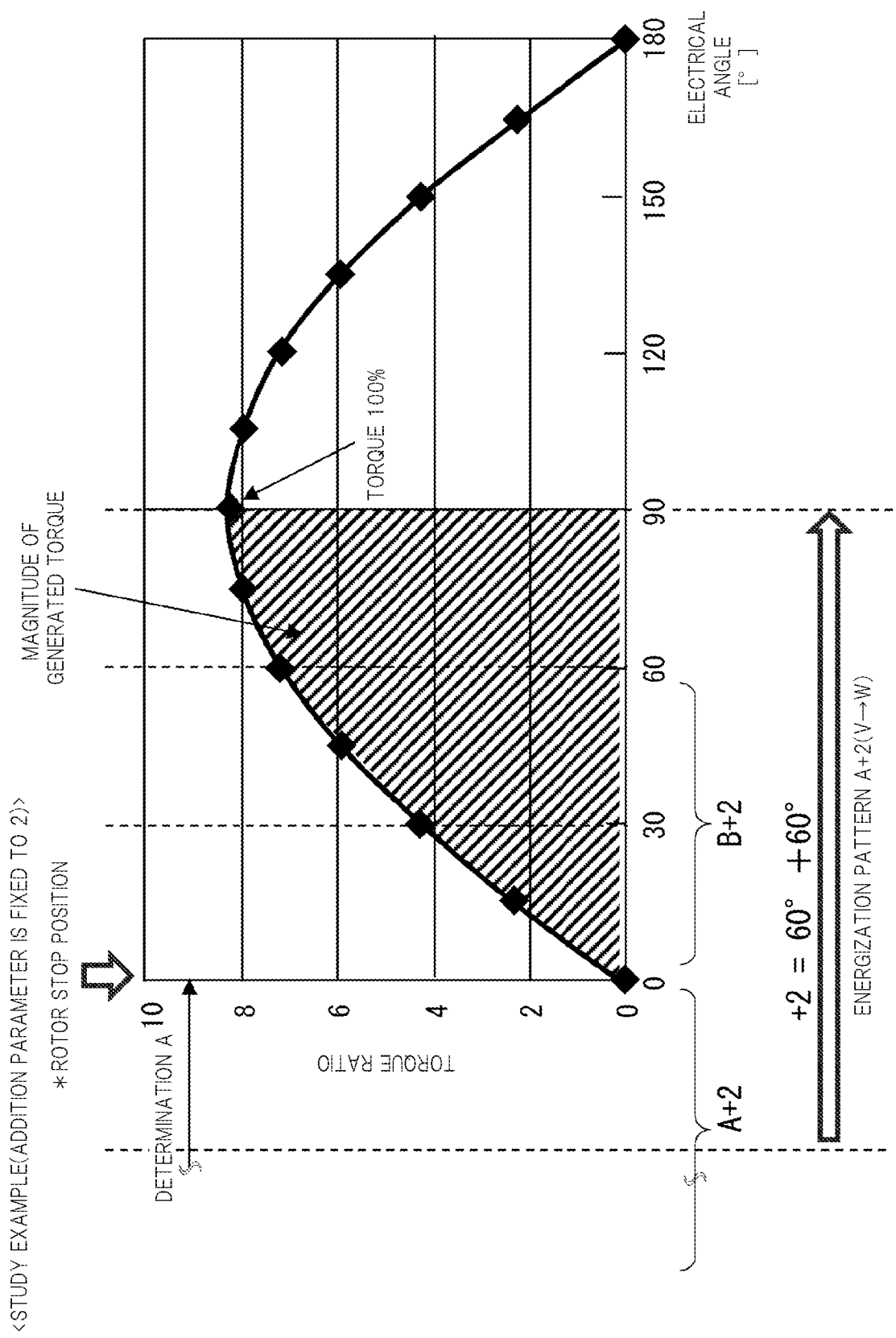

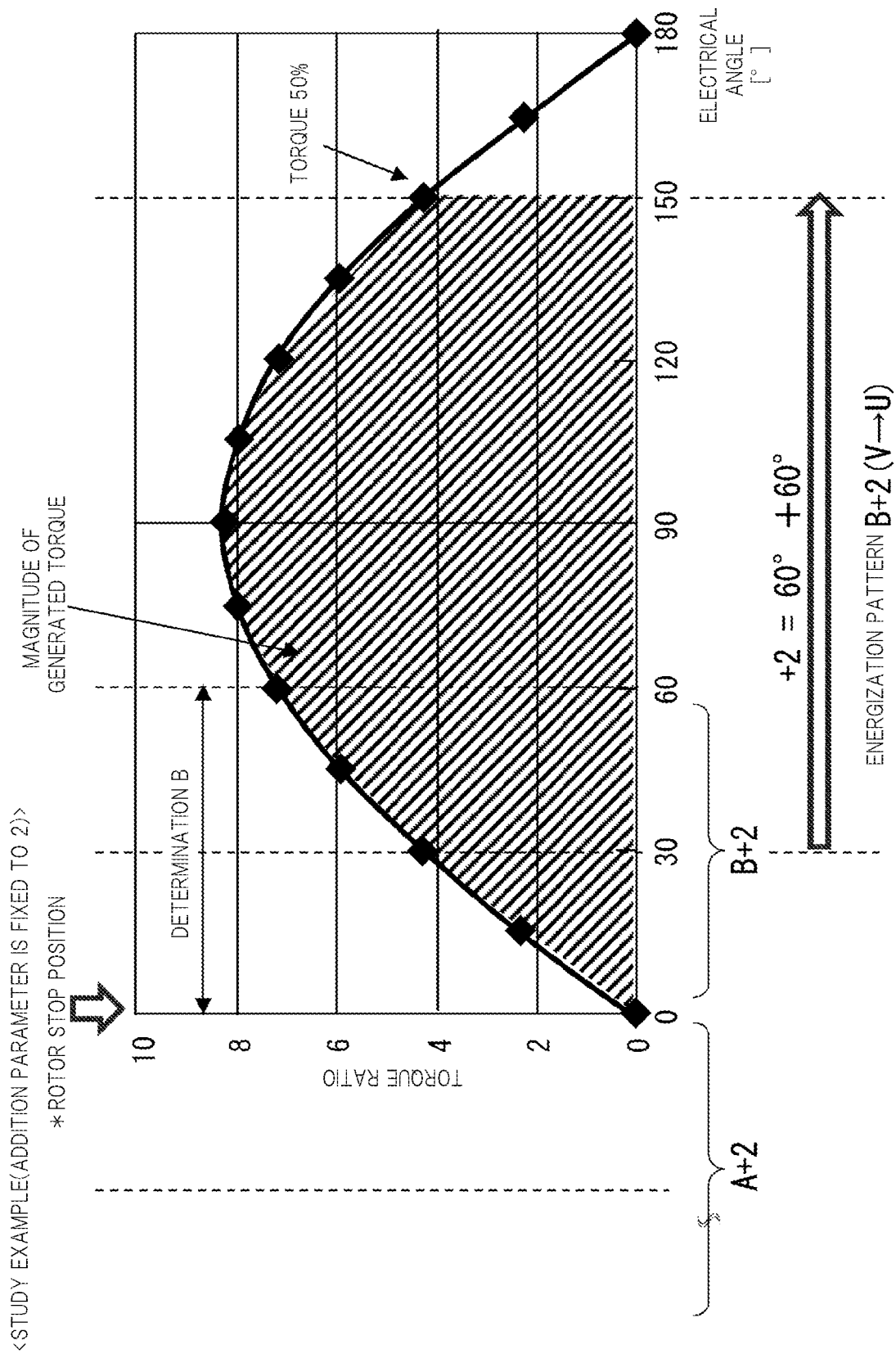

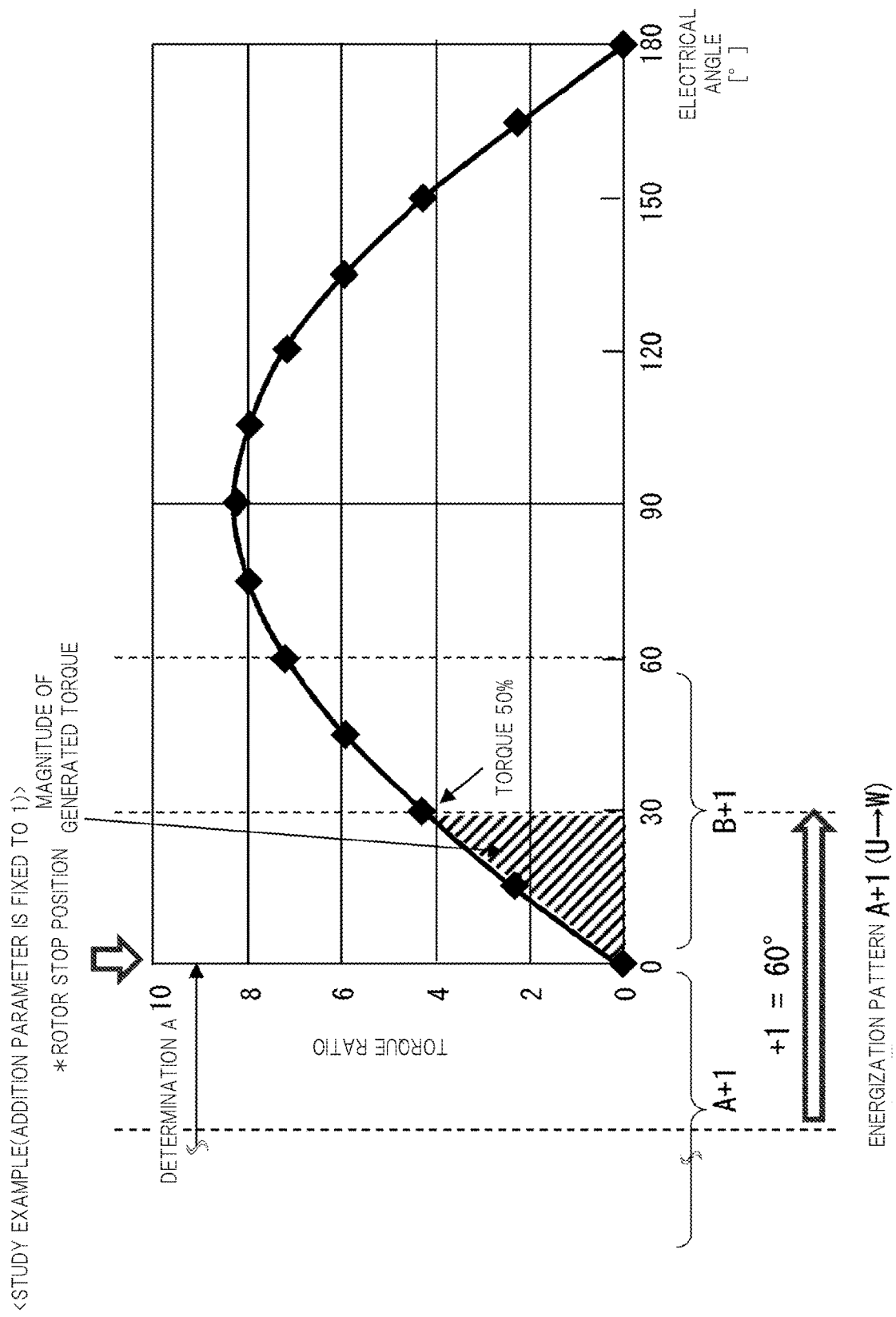

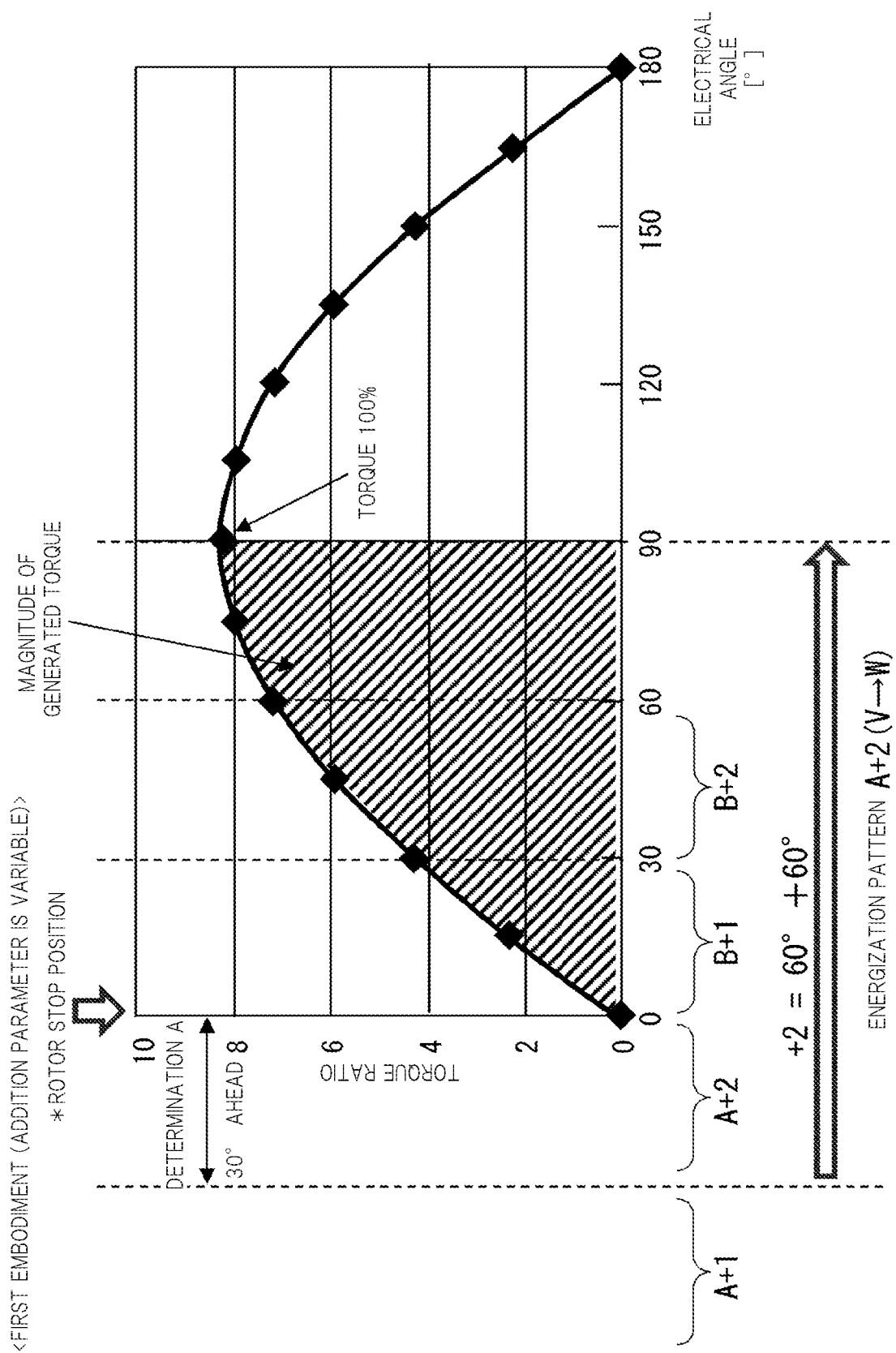

SEMICONDUCTOR DEVICE, MOTOR DRIVE SYSTEM, AND CONTROL METHOD THEREOF

CROSS-REFERENCE TO RELATED APPLICATION

This application claims priority to Japanese Patent Application No. 2022-008009 filed on Jan. 21, 2022. The disclosure of Japanese Patent Application No. 2022-008009, including the specification, drawings and abstract is incorporated herein by reference in its entirety.

BACKGROUND

The present invention relates to a semiconductor device, a motor drive system, and a control method thereof.

In comparison to a sensor-equipped motor including a Hall sensor that detects a position of a rotor, a sensorless motor not including the Hall sensor has been developed from the viewpoint of downsizing and low cost.

In a drive system that drives a sensorless three-phase brushless direct current (DC) motor, a back electromotive force (BEMF) generated in a stator coil of a non-energized phase by rotation of a rotor is detected to estimate a relative position of a magnetic pole pair of the rotor with respect to the stator coil. The drive system rotationally drives the motor by applying a drive current (or a drive voltage) to the three-phase stator coil based on the estimated position of the rotor.

There is disclosed technique listed below.
[Patent Document 1] Japanese Patent No. 4684763

In a case of the sensorless motor, the back electromotive force is not generated in a state in which the motor is stationary, and thus, the position of the rotor cannot be detected from the back electromotive force. As a related art, for example, the Patent Document 1 discloses a stationary position detection circuit that detects the position of the rotor when the motor is stationary.

SUMMARY

In recent years, a motor is used not only for a load such as a fan that is rotatable with a low torque from a stationary state, but also for a load such as a power tool (electric tool) that requires a high torque to start rotation. Therefore, a motor drive technique capable of driving a motor with a higher torque is required.

Other objects and novel characteristics will be apparent from the description of the present specification and the accompanying drawings.

According to one embodiment, a semiconductor device detects a current flowing through a three-phase motor by driving of a drive circuit, and controls the drive circuit, based on the detected current. The three-phase motor has a first phase, a second phase, and a third phase. When the three-phase motor is stationary, the semiconductor device controls an energization pattern in such a way that a wave detection current sequentially flows from the drive circuit to a first interphase between the first phase and the second phase, a second interphase between the second phase and the third phase, and a third interphase between the third phase and the first phase. The semiconductor device obtains, from the detected wave detection current, a first interphase current difference, a second interphase current difference, and a third interphase current difference, each of which is a difference among wave detection currents flowing in directions opposite to one another, for each of the first interphase, the second interphase, and the third interphase. The semiconductor device determines an energization pattern used in initial driving of the three-phase motor, based on a magnitude relationship among the first interphase current difference, the second interphase current difference, and the third interphase current difference.

According to one embodiment, the motor can be driven with a higher torque.

BRIEF DESCRIPTIONS OF THE DRAWINGS

FIG. 4A is a schematic diagram illustrating a positional relationship between a magnetic pole of a stator coil and a magnetic pole of a rotor of the brushless DC motor according to the first embodiment.

FIG. 6 is a flowchart illustrating a flow of the drive control of the brushless DC motor according to the first embodiment.

FIG. 7D is a flowchart illustrating a flow of the inductive sensing operation of the brushless DC motor according to the first embodiment.

FIG. 10A is a graph illustrating a relationship between an energization pattern and a generated torque with respect to a detected position of a rotor of the brushless DC motor in the study example.

FIG. 10B is a graph illustrating a relationship between an energization pattern and a generated torque with respect to a detected position of the rotor of the brushless DC motor in the study example.

FIG. 11A is a graph illustrating a relationship between an energization pattern and a generated torque with respect to a detected position of the rotor of the brushless DC motor in the study example.

FIG. 13A is a graph illustrating a relationship between an energization pattern and a generated torque with respect to a detected position of the rotor of the brushless DC motor according to the first embodiment.

DETAILED DESCRIPTION

Figure 1:
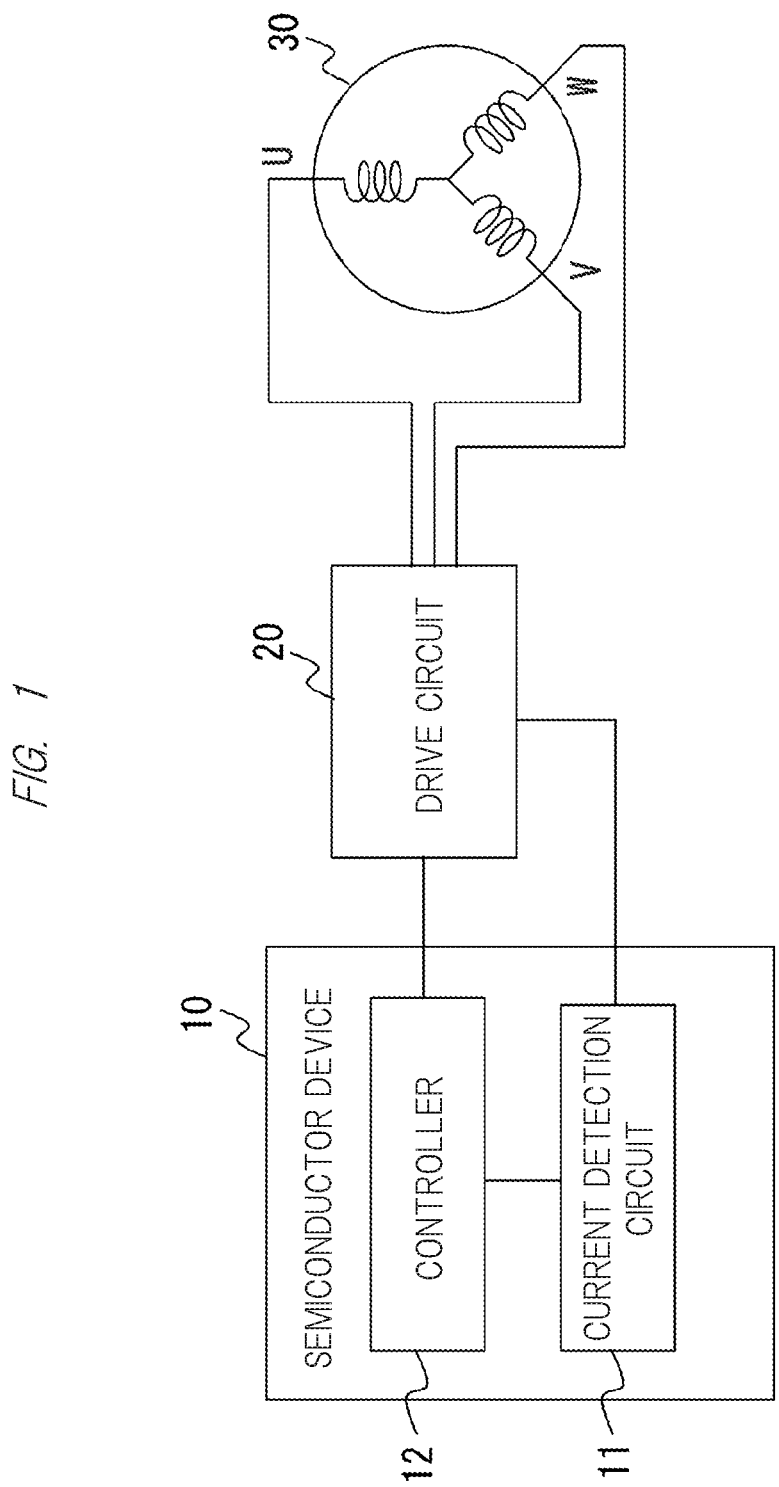
FIG. 1 is a configuration diagram illustrating an outline of a semiconductor device according to an embodiment.

Hereinafter, embodiments will be described with reference to the drawings. For clarity of description, the following description and drawings are omitted and simplified as appropriate. Furthermore, each element illustrated in the drawings as a functional block that performs various processings can be implemented by a central processing unit (CPU), a memory, and other circuits in terms of hardware, or is implemented by a program loaded in a memory or the like in terms of software. Therefore, Ss understood by those skilled in the art that these functional blocks can be implemented in various forms by only hardware, only software, or a combination thereof, and the functional blocks are not limited to any of them. In the drawings, the same elements are denoted by the same reference signs, and an overlapping description is omitted as necessary.

Outline of Embodiment

If a sensorless three-phase brushless DC motor is rotated from a stationary state, for example, the position of a rotor is detected at every electrical angle of 60°, and a current is caused to flow in a direction in which a torque is desired to be generated to rotate the rotor.

A motor drive system such as a fan with a relatively lower load does not require a high torque to operate a stationary rotor. Therefore, an energization pattern (for example, from a U phase to a V phase) in which a torque is generated from the detected position of the rotor is simply obtained to perform initial driving, and the motor can be steadily driven after increase of rotation speed by detection of a back electromotive force (BEMF) generated in a non-energized phase.

However, in a motor drive system such as a power tool in which a high load is applied from a stationary state, it may be difficult to generate a high torque equivalent to that of a motor with a Hall sensor. In particular, in a case of an interior permanent magnet (IPM) motor, a cogging torque is generated at more rotor positions than in a case of a surface permanent magnet (SPM) motor. Therefore, if a torque is measured with the same motors, a torque of a sensorless motor may be inferior to a torque of a sensor-equipped motor depending on a rotor stop position. In this regard, the embodiment enables even a sensorless motor to obtain an equivalent torque to that of a sensor-equipped motor.

FIG. 1 illustrates a schematic configuration of a semiconductor device according to an embodiment. A semiconductor device 10 according to the embodiment is a semiconductor device for controlling a drive circuit 20 that drives a three-phase motor 30. As illustrated in FIG. 1, the semiconductor device 10 according to the embodiment includes a current detection circuit 11 and a controller 12. The three-phase motor 30 has a first phase (for example, a U phase), a second phase (for example, a V phase), and a third phase (for example, a W phase). Note that the first phase, the second phase, and the third phase may correspond to any of the U phase, the V phase, and the W phase, respectively.

The current detection circuit 11 detects a current flowing through the three-phase motor 30 by driving of the drive circuit 20. The controller 12 controls the drive circuit 20 based on the current detected by the current detection circuit 11. When the three-phase motor 30 is stationary, the controller 12 controls an energization pattern in such a way that a wave detection current sequentially flows from the drive circuit 20 to a first interphase between the first phase and the second phase, a second interphase between the second phase and the third phase, and a third interphase between the third phase and the first phase. Note that the first interphase, the second interphase, and the third interphase may correspond to any of an interphase between the first phase and the second phase, an interphase between the second phase and the third phase, and an interphase between the third phase and the first phase, respectively. Next, from the wave detection current detected by the current detection circuit 11, the controller 12 obtains a first interphase current difference, a second interphase current difference, and a third interphase current difference, each of which is a difference among wave detection currents flowing in directions opposite to one another, for each of the first interphase, the second interphase, and the third interphase. Next, the controller 12 determines an energization pattern for the initial driving of the three-phase motor 30 based on a magnitude relationship among the first interphase current difference, the second interphase current difference, and the third interphase current difference.

In the embodiment, by such a configuration, the energization pattern for the initial driving of the motor can be appropriately determined, and therefore, the motor can be driven with a high torque from a stationary state.

First Embodiment

Next, a motor drive system according to a first embodiment will be described.

<System Configuration>

Figure 2:
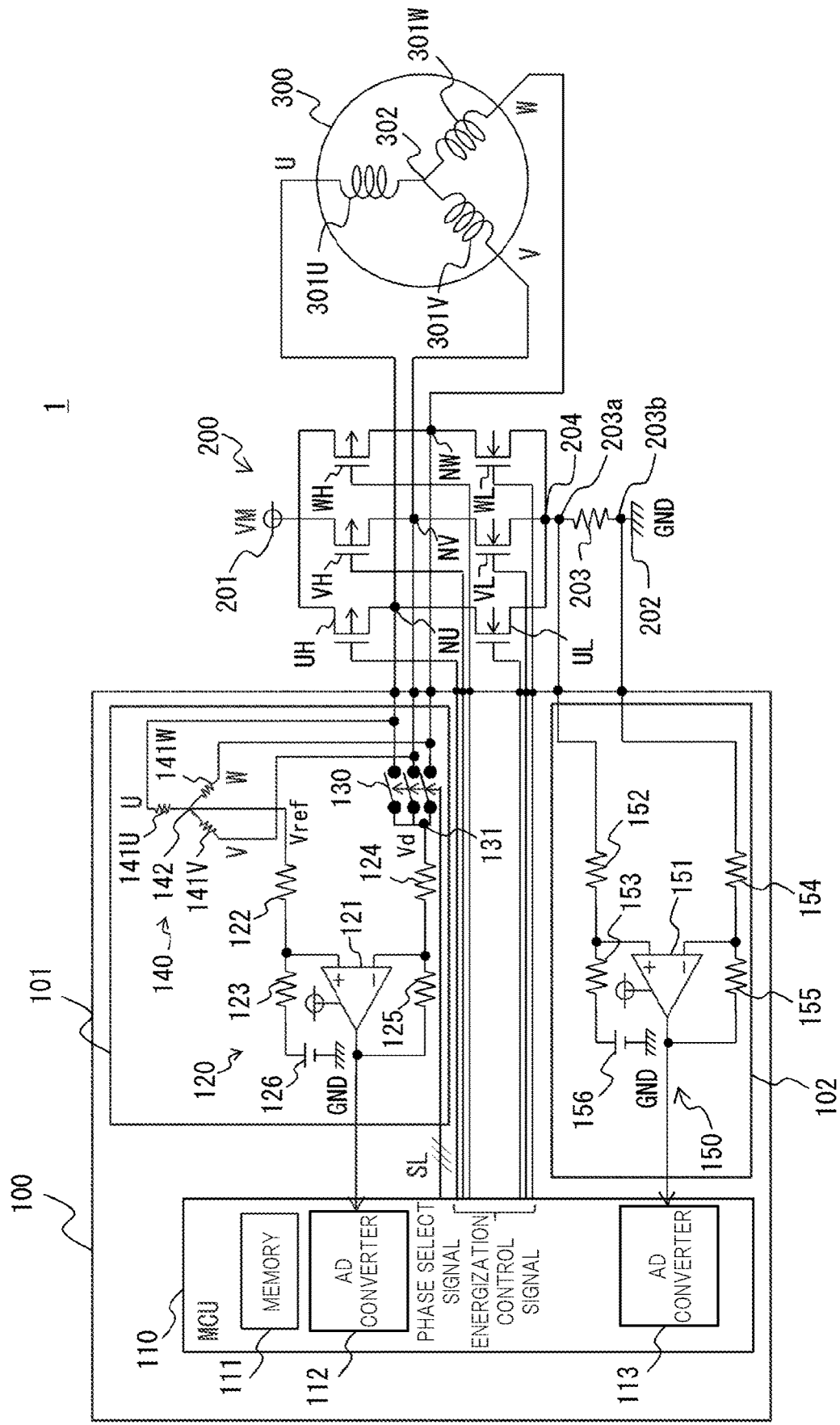
FIG. 2 is a configuration diagram illustrating a configuration example of a motor drive system according to a first embodiment.

First, a system configuration of the present embodiment will be described. FIG. 2 illustrates a configuration example of the motor drive system according to the present embodiment. As illustrated in FIG. 2, a motor drive system 1 according to the present embodiment includes a semiconductor device 100, an inverter circuit 200, and a brushless DC motor 300.

The brushless DC motor 300 is a sensorless three-phase brushless DC motor. Note that not only the three-phase motor but also a multiphase motor having an arbitrary number of phases may be used. The brushless DC motor 300 is, for example, an IPM motor used for a power tool or the like, but may be another motor such as an SPM motor.

The brushless DC motor 300 includes three stator coils 301 serving as three-phase loads. Specifically, the brushless DC motor 300 includes a U-phase stator coil 301U, a V-phase stator coil 301V, and a W-phase stator coil 301W. A connection mode of the stator coils 301U, 301V, and 301W is Y-connection, and a node thereof is referred to as a midpoint 302.

The brushless DC motor 300 includes the stator coils 301U, 301V, and 301W and a rotor (not illustrated) with one or more magnetic pole pairs. For example, the rotor is a two-pole-pair rotor having two sets of magnetic poles. Note that the rotor is not limited to having two pole pairs, and may have an optional number of pole pairs. When a motor current with a predetermined energization pattern is applied from the inverter circuit 200 to the stator coils 301U, 301V, and 301W, the rotor of the brushless DC motor 300 is rotationally driven.

The inverter circuit 200 is a drive circuit that drives the brushless DC motor 300 in accordance with control (an energization control signal) output from the semiconductor device 100. The inverter circuit 200 can also be said to be a switching circuit that switches the energization pattern of the brushless DC motor 300 in accordance with the control output from the semiconductor device 100.

The inverter circuit 200 is, for example, a three-phase bridge circuit. The inverter circuit 200 includes three pairs of metal oxide semiconductor (MOS) transistors connected in series. The three MOS transistor pairs are connected in parallel between a power supply voltage VM and a ground voltage GND. Each MOS transistor pair corresponds to each phase of the brushless DC motor 300.

Specifically, the inverter circuit 200 includes a U-phase upper arm MOS transistor UH, a U-phase lower arm MOS transistor UL, a V-phase upper arm MOS transistor VH, a V-phase lower arm MOS transistor VL, a W-phase upper arm MOS transistor WH, and a W-phase lower arm MOS transistor WL. The upper arm is also referred to as a high side, and the lower arm is also referred to as a low side.

The MOS transistor UH and the MOS transistor UL are connected in series between a first power supply node 201 that provides the power supply voltage VM this arrangement order and a connection node 204 on a low potential side. An output node NU, which is a connection point between the MOS transistor UH and the MOS transistor UL, is connected to one end of the U-phase stator coil 301U.

The MOS transistor VH and the MOS transistor VT are connected in series between the first power supp v node 201 and the connection node 204 in this arrangement order. An output node NV, which is a connection point between the MOS transistor VH and the MOS transistor VL, is connected to one end of the V-phase stator coil. 301V.

The MOS transistor WH and the MOS transistor WL are connected in series between the first power supply node 201 and the connection node 204 in this arrangement order. An output node NW, which is a connection point between the MOS transistor WH and the MOS transistor WL, is connected to one end of the W-phase stator coil 301W.

For example, the upper arm MOS transistors UH, VH, and WH are implemented by P-channel MOS transistors, and the lower arm MOS transistors UL, VL, and WL are implemented by N-channel MOS transistors. Note that the present invention is not limited thereto, and the upper arm MOS transistors UH, VH, and WH may be implemented by N-channel MOS transistors while the lower arm MOS transistors UL, VL, and WL may be implemented by P-channel MOS transistors. Alternatively, all the MOS transistors UH, UL, VH, VL, WH, and WL may be implemented by either N-channel MOS transistors or P-channel MOS transistors. Furthermore, for example, a power MOSFET is used as the semiconductor switching element constituting the inverter circuit 200, but the semiconductor switching element is not limited thereto, and other types of field effect transistors, bipolar transistors, insulated gate bipolar transistors (IGBTs), and the like may be used.

In addition, the inverter circuit 200 includes a shunt resistor 203 for detecting a motor current flowing between two phases. The shunt resistor 203 is connected between the connection node 204 and a second power supply node 202 that provides the ground voltage GND.

The semiconductor device 100 is a semiconductor device that causes the inverter circuit 200 to control an operation of driving the brushless DC motor 300. The semiconductor device 100 includes a BEMF detection circuit 101, a current detection, circuit 102, and a micro controller unit (MCU) 110. For example, the semiconductor device 100 is implemented by a system on chip (SiP) including a semiconductor chip on which the BEMF detection circuit 101 is mounted, a semiconductor chip on which the current detection circuit 102 is mounted, and a semiconductor chip on which the MCU 110 is mounted. Note that the semiconductor device 100 is not limited thereto, and the semiconductor device 100 may be implemented by any number of semiconductor chips or may be implemented by other types of packages. Alternatively, the BEMF detection circuit 101, the current detection circuit 102, and the MCU 110 may be different semiconductor devices (packages).

The BEMF detection circuit 101 is a circuit for detecting a back electromotive force (or a mutual inductive voltage) generated in the stator coil of a non-energized phase in the brushless DC motor 300. Specifically, the BEMF detection circuit 101 detects voltages of the output nodes NU, NV, and NW of the inverter circuit 200. For example, the BEMF detection circuit 101 includes a differential amplifier 120, a switch circuit 130, and a virtual midpoint generation circuit 140. Note that other configurations may be adopted as long as the back electromotive force (the voltages of the output nodes NU, NV, and NW) generated in the brushless DC motor 300 can be detected.

The switch circuit 130 selects a phase of a voltage to be detected in accordance with control output from the MCU 110. The switch circuit 130 is connected to the output nodes NU, NV, and NW of the inverter circuit 200. The switch circuit 130 connects an output node of the selected phase among the output nodes NU, NV, and NW and a detection node 131 to each other in accordance with a phase select signal SL output from the MCU 110.

The virtual midpoint generation circuit 140 provides a virtual midpoint 142 having a voltage that plays the same role as the midpoint 302 of the brushless DC motor 300. The virtual midpoint generation circuit 140 includes a resistive element 141U connected between the virtual midpoint 142 and the output node NU, a resistive element 141V connected between the virtual midpoint 142 and the output node NV, and a resistive element 141W connected between the virtual midpoint 142 and the output node NW. For example, a voltage of the virtual midpoint 142 is set as a reference voltage Vref, but a voltage of the midpoint 302 of the brushless DC motor 300 may also be set as the reference voltage Vref.

The differential amplifier 120 amplifies a difference between a voltage Vd of the detection node 131, which is a voltage of the output node of the selected phase, and the reference voltage Vref of the virtual midpoint 142, which is a voltage equivalent to that of the midpoint 302 of the brushless DC motor 300. For example, the differential amplifier 120 is configured using an operational amplifier. The differential amplifier 120 includes an operational amplifier 121 and resistive elements 122 to 125. Note that a differential amplifier having a different configuration may also be used.

The resistive element 122 is connected between the virtual midpoint 142 (or midpoint 302) that supplies the reference voltage Vref and a positive (+) terminal (non-inverting input terminal) of the operational amplifier 121. One end of the resistive element 123 is connected to the positive (+) terminal of the operational amplifier 121, and an offset voltage based on the ground potential GND is applied to the other end of the resistive element 123 by a voltage element 126. The resistive element 124 is connected between the detection node 131 and a negative (−) terminal (inverting input terminal) of the operational amplifier 121. The resistive element 125 is connected between the negative terminal and an output terminal of the operational amplifier 121. The output terminal of the operational amplifier 121 is connected to an input terminal of the MCU 110 (an analog to digital (AD) converter 112 described later).

The current detection circuit 102 is a circuit for detecting a motor current (which may be referred to as a wave detection current) flowing between phases of the brushless DC motor 300. For example, the current detection circuit 102 is a circuit that can detect the motor current by outputting a voltage generated in the shunt resistor 203. Note that the motor current may be detected by other methods.

For example, the current detection circuit 102 includes a differential amplifier 150. The differential amplifier 150 amplifies a voltage difference between both ends (nodes 203a and 203b) of the shunt resistor 203. For example, the differential amplifier 150 is implemented by an operational amplifier as similar to the differential amplifier 120. The differential amplifier 150 includes an operational amplifier 151 and resistive elements 152 to 155. Note that a differential amplifier having a different configuration may also be used.

The resistive element 152 is connected between the node 203a of the shunt resistor 203 that is adjacent to the connection node 204 and a positive (+) terminal of the operational amplifier 151. One end of the resistive element 153 is connected to the positive (+) terminal of the operational amplifier 151, and an offset voltage based on the ground potential GND is applied to the other end of the resistive element 153 by a voltage element 156. The resistive element 154 is connected between the node 203b of the shunt resistor 203 that is adjacent to GND and a negative (−) terminal of the operational amplifier 151. The resistive element 155 is connected between the negative (−) terminal and an output terminal of the operational amplifier 151. The output terminal of the operational amplifier 151 is connected to an input terminal of the MCU 110 (an AD converter 113 described later).

The MCU 110 is a controller that controls the operation of the inverter circuit 200 based on the back electromotive force detected by the BEMF detection circuit 101 and the motor current detected by the current detection circuit 102. It can also be said that the MCU 110 is a control circuit that controls the energization pattern applied from the inverter circuit 200 to each phase.

For example, the MCU 110 is implemented so that a computer including a memory 111, a central processing unit (CPU) (not illustrated), and the like is included into one integrated circuit. The MCU 110 achieves various functions according to the present embodiment by executing a program stored in the memory 111. Furthermore, the memory 111 stores information necessary for the operation of the MCU 110 such as a detection value of the motor current (wave detection current) detected by the current detection circuit 102. Note that the memory 111 may be an external storage device outside the MCU 110 (or the semiconductor device 100). That is, the MCU 110 may acquire the detection value of the motor current from the external storage device.

The MCU 110 further includes the analog-to-digital (AD) converters 112 and 113. The AD converter 112 converts an output of the differential amplifier 120 into a digital value. That is, the AD converter 112 is an acquisition circuit that acquires a detection value of the back electromotive force (the voltages of the output nodes NU, NV, and NW) detected by the BEMF detection circuit 101. The AD converter 113 converts an output of the differential amplifier 150 into a digital value. That is, the AD converter 113 is an acquisition circuit that acquires a detection value of the motor current (in this example, the voltage of the shunt resistor) detected by the current detection circuit 102.

As the drive control for the brushless DC motor 300, the MCU 110 estimates the position of the rotor, based on the back electromotive force acquired by the AD converter 112 and the motor current acquired by the AD converter 113. The MCU 110 outputs energization control signals based on the estimated position of the rotor to gates of the MOS transistors UH, UL, VH, VL, WH, and WL of the inverter circuit 200, respectively. In addition, the MCU 110 generates the phase select signal SL for switching the switch circuit 130, based on the generated energization control signals.

An operation of the motor drive control will be described below after describing the operation mode of the brushless DC motor, the energization pattern, and the positional relationship between the stator coil and the rotor as a premise of the motor drive control according to the present embodiment.

<Operation Mode>

The MCU 110 detects a detection target corresponding to the operation mode in accordance with three stages of operation modes of the brushless DC motor 300, and causes the inverter circuit 200 to control the driving of the brushless DC motor 300 in accordance with the detection result. Each operation mode will be described below.

[Mode 1]

Mode 1 is an operation mode used when the brushless DC motor 300 is stationary (stopped) before being started (at the time of starting). In Mode 1, a motor current "I" (the motor current in Mode 1 is also referred to as the wave detection current) is detected, and the position of the rotor is estimated from a self-inductance "L" using the following Expression (1). Note that the position estimation (detection) of the rotor acquired when the motor is stationary in Mode 1 is also referred to as inductive sensing (I.S.).

$$V/R(1-e^{\{-t \times (R/L)\}}) \ldots \quad \text{Expression (1)}$$

I: motor current, V: applied voltage, R: interphase resistance, t: application time, L: self-inductance Expression (1) shows that the motor current I depends on the position of the rotor due to the L components varying depending on the position of the rotor. That is, in Mode 1, the MCU 110 controls the MOS transistor of the inverter circuit 200, causes a current to flow between the respective phases for a certain period of time, and detects the motor current I (wave detection current) flowing through the respective phases. In the MCU 110, the current detection circuit 102 detects a current amount of the motor current varying depending on the time in Expression (1). In Mode 1, since it is not necessary to apply a torque to the motor, the wave detection current aiming at only the position detection is caused to flow between the phases, and the position of the rotor is detected. In Expression (1), since the voltage V and the resistance R are constant, the self-inductance L can be obtained from the detected motor current I, and the position of the rotor can be estimated from the obtained self-inductance L.

[Mode 2]

Mode 2 is an operation mode used when the brushless DC motor 300 starts rotating after Mode 1 (at the time of initial driving). In Mode 2, a voltage "$e_2$" induced by mutual induction is detected, and the motor is accelerated using the following Expressions (2) to (4). Note that application of a startup torque for initial driving in Mode 2 is also referred to as kicking.

$$\Phi_1 = B_1 S = \mu n_1 I_1 S \text{(energized phase)} \ldots \quad \text{Expression (2)}$$

$$K\Phi_2(\textit{non-energized phase}) \propto \Phi_1(\text{energized phase}) \ldots \text{Expression (3)}$$

$$e_2 \propto -n_2 \Delta \Phi_2 / \Delta t \ldots \quad \text{Expression (4)}$$

$\Phi_1$: magnetic flux of energized phase, $B_1$: magnetic flux density of energized phase, S: area, μ: magnetic permeability, $I_1$: motor current, $\Phi_2$: magnetic flux of non-energized phase, $e_2$: mutual inductive voltage (voltage divided by ratio of inductance of stator coil)

Expression (3) shows that there is a proportional relationship between the magnetic flux Di of the energized phase and the magnetic flux $\Phi_2$ of the non-energized phase. When the motor is stationary, the back electromotive force cannot be detected. Therefore, the fact that the magnetic flux $\Phi_2$ has positional dependency as different from the magnetic flux $\Phi_1$ of Expression (2) due to a coefficient "K" of Expression (3) is used. That is, the voltage $e_2$ obtained by Expression (4) also has position dependency. Therefore, in Mode 2, the MCU 110 controls the MOS transistor of the inverter circuit 200 to cause a current to flow in the energized phase, and causes the BEMF detection circuit 101 to detect the voltage $e_2$ generated in the non-energized phase. As a result, the position of the rotor is detected while applying a torque to the rotor of the motor, and the rotor is accelerated to a constant rotation.

[Mode 3]

Mode 3 is an operation mode used when the brushless DC motor 300 rotates at a high speed after Mode 2 (at the time of rotation) In Mode 3, the back electromotive force "V" is detected, and the motor is rotated using the following Expression (5). Note that driving of the motor based on the back electromotive force in Mode 3 also referred to as steady driving.

$$V = Blv [V] \ldots \quad \text{(Expression 5)}$$

V: back electromotive force, B: magnetic flux density, l: coil length, v: speed=$2\pi rn$ [m/s](r: rotation radius, n: number of turns)

Expression (5) shows that the back electromotive force V depends on the magnetic flux density B and the speed v. In Mode 3, the back electromotive force "V" proportional to "v" (the rotation speed of the motor) is generated. Therefore, the MCU 110 rotates the motor by causing the BEMF detection circuit 101 to detect the back electromotive force V to detect the position of the rotor of the motor based on Expression (5).

<Energization Pattern>

Figure 3:
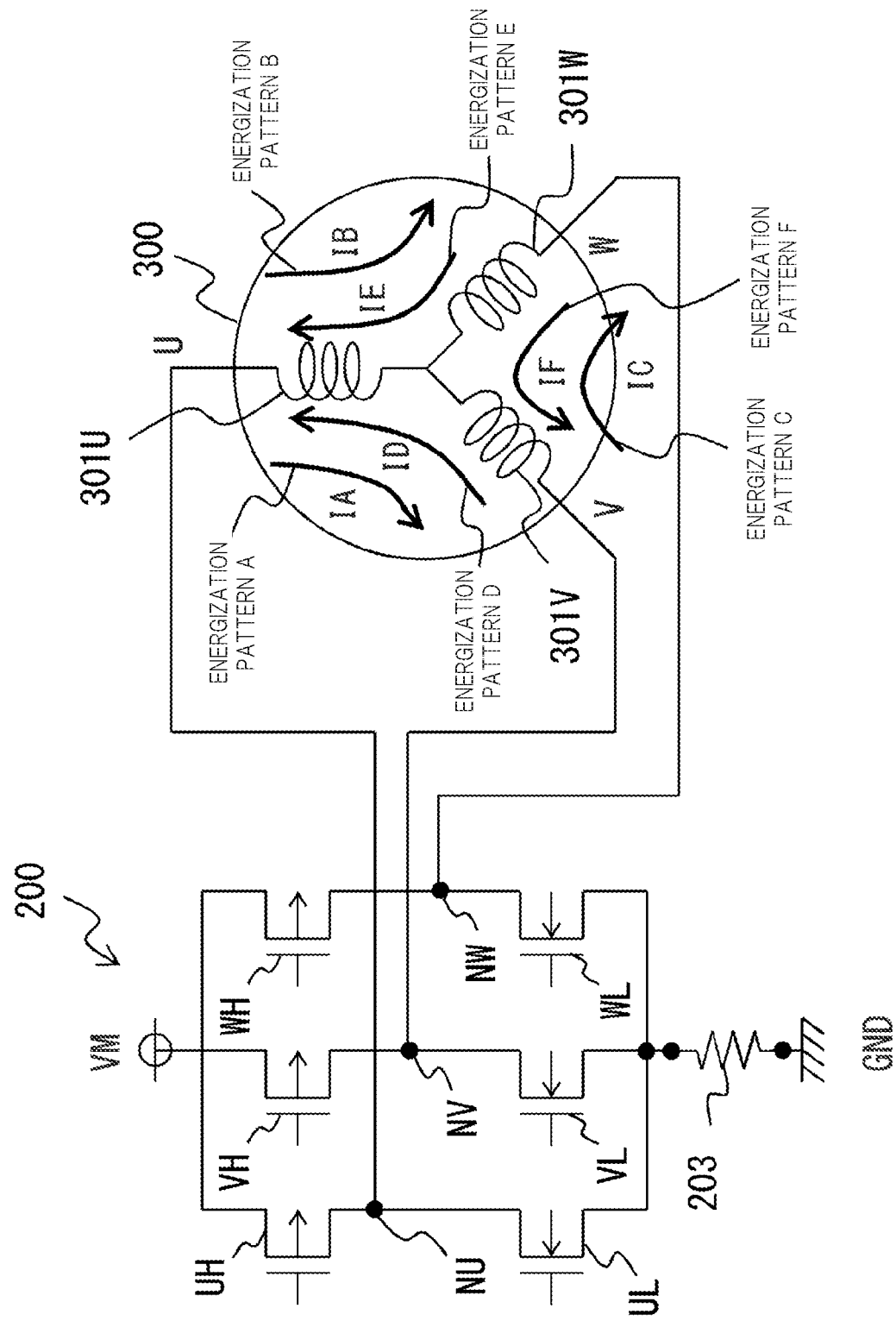
FIG. 3 is a diagram for describing an energization pattern of a brushless DC motor according to the first embodiment.

In the inductive sensing of Mode 1, the MCU 110 detects the position of the rotor by causing the motor current (wave detection current) to flow between the phases of the brushless DC motor 300. Specifically, the MCU 110 causes currents IA to IF to flow between the respective phases in accordance with six energization patterns A to F as illustrated in FIG. 3. Each energization pattern will be described below. Note that the current (voltage) is applied in accordance with the same energization pattern even in Mode 2 and Mode 3.

[Energization Pattern A]

The energization pattern A (for example, a first energization pattern) is a pattern in which the current IA (for example, a first current) is caused to flow from the U-phase stator coil 301U (for example, a first phase) to the V-phase stator coil 301V (for example, a second phase) Specifically, the MCU 110 controls the U-phase upper arm MOS transistor UH and the V-phase lower arm MOS transistor VL of the inverter circuit 200 to be in an ON state and controls the others to be in an OFF state. Note that, in the energization pattern A, the W phase is referred to as a "non-energized phase", the U phase is referred to as an "upstream energized phase", and the V phase is referred to as a "downstream energized phase". The current flows from a stator coil of the upstream energized phase to a stator coil of the downstream energized phase. The same definition applies to other energization patterns.

[Energization Pattern B]

The energization pattern B (for example, a second energization pattern) is a pattern in which the current IB (for example, a second current) is caused to flow from the U-phase stator coil 301U to the W-phase stator coil 301W (for example, a third phase). Specifically, the MCU 110 controls the U-phase upper arm MOS transistor UH and the W-phase lower arm MOS transistor WL of the inverter circuit 200 to be in the ON state and controls the others to be in the OFF state.

[Energization Pattern C]

The energization pattern C (for example, a third energization pattern) is a pattern in which the current IC (for example, a third current) is caused to flow from the V-phase stator coil 301V to the W-phase stator coil 301W. Specifically, the MCU 110 controls the V-phase upper arm MOS transistor VH and the W-phase lower arm MOS transistor WL of the inverter circuit 200 to be in the ON state and controls the others to be in the OFF state.

[Energization Pattern D]

The energization pattern D (for example, a fourth energization pattern) is a pattern in which the current ID (for example, a fourth current) is caused to flow from the V-phase stator coil 301V to the U-phase stator coil 301U. Specifically, the MCU 110 controls the V-phase upper arm MOS transistor VH and the U-phase lower arm MOD transistor UL of the inverter circuit 200 to be in the ON state and controls the others to be in the OFF state.

[Energization Pattern E]

The energization pattern E (for example, a fifth energization pattern) is a pattern in which the current IE (for example, a fifth current) is caused to flow from the W-phase stator coil 301W to the U-phase stator coil 301U. Specifically, the MCU 110 controls the W-phase upper arm MOS transistor WH and the U-phase lower arm MOS transistor UL of the inverter circuit 200 to be in the ON state and controls the others to be in the OFF state.

[Energization Pattern F]

The energization pattern F (for example, a sixth energization pattern) is a pattern in which the current IF (sixth current) is caused to flow from the W-phase stator coil 301W to the V-phase stator coil 301V. Specifically, the MCU 110 controls the W-phase upper arm MOS transistor WH and the V-phase lower arm MOS transistor VL of the inverter circuit 200 to be in the ON state and controls the others to be in the OFF state.

<Positional Relationship Between Stator Coil and Rotor>

The MCU 110 determines the energization pattern for applying the startup torque in the kicking of Mode 2, based on the position of the rotor detected in the inductive sensing of Mode.

Figure 4B:
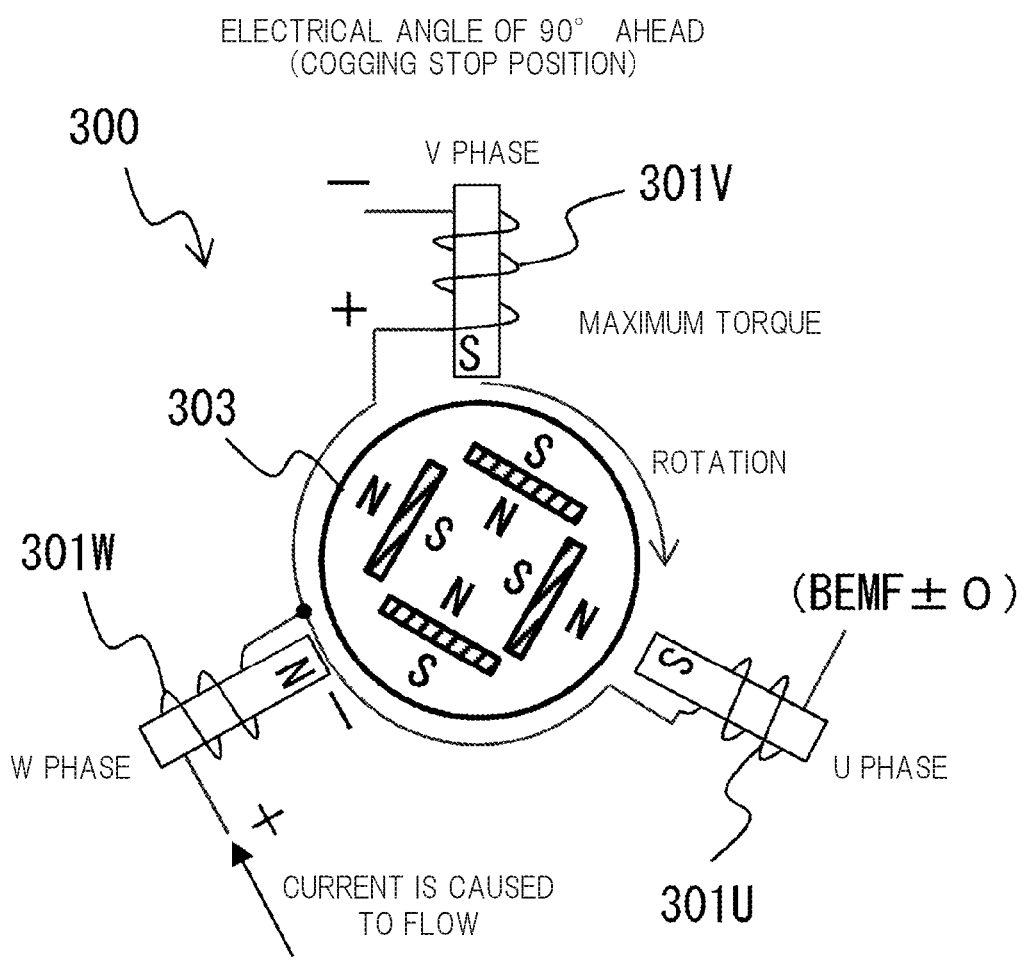
FIG. 4B is a schematic diagram illustrating a positional relationship between the magnetic pole of the stator coil and the magnetic pole of the rotor of the brushless DC motor according to the first embodiment.
Figure 4C:
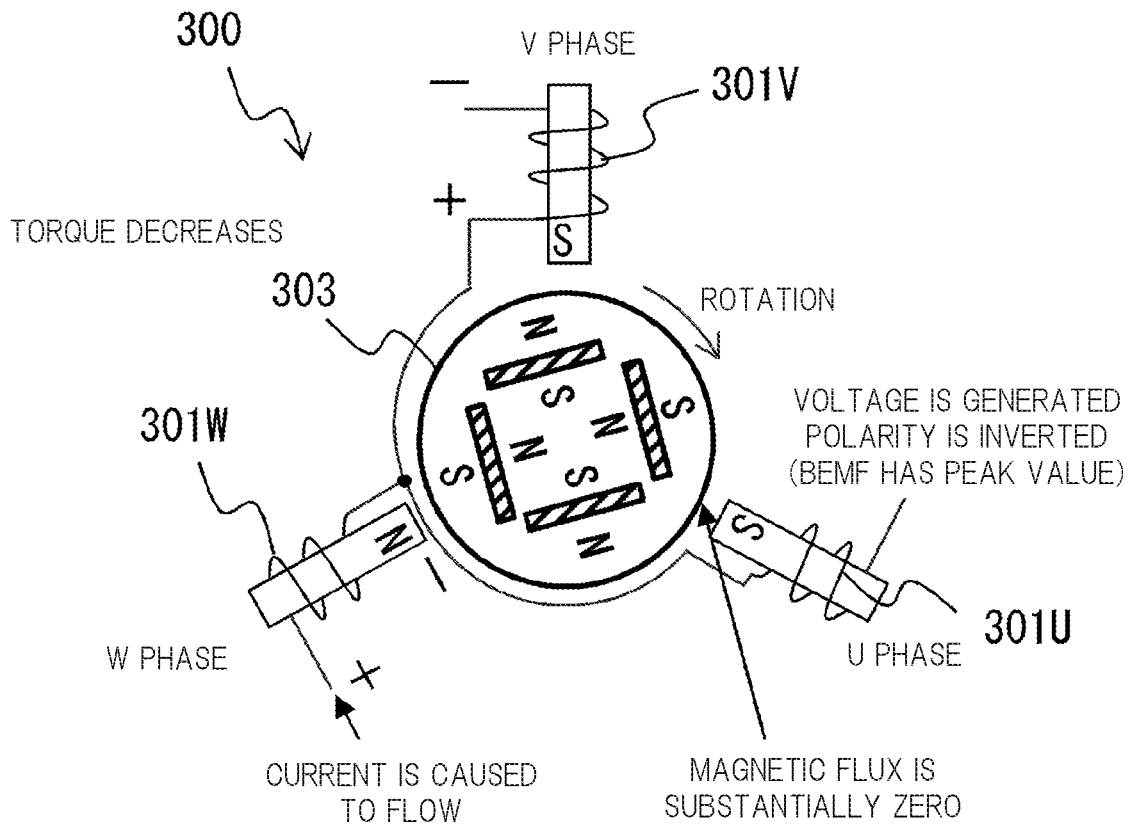
FIG. 4C is a schematic diagram illustrating a positional relationship between the magnetic pole of the stator coil and the magnetic pole of the rotor of the brushless DC motor according to the first embodiment.

The rotation of the rotor and the generated torque at the time of kicking will be described with reference to FIGS. 4A to 4C. FIGS. 4A to 4C illustrate a positional relationship between the magnetic pole of the stator coil and the magnetic pole of the rotor. FIGS. 4A to 4C illustrate a rotor example in which a rotor 303 has two magnetic pole pairs (two pairs of S poles and N poles) Therefore, in this example, the electrical angle is twice the mechanical angle.

FIG. 4A illustrates a positional relationship between the magnetic pole of the stator coil and the magnetic pole of the rotor at an electrical anole of 120° ahead, FIG. 4B illustrates a positional relationship between the magnetic pole of the stator coil and the magnetic pole of the rotor at an electrical angle of 90° ahead, and FIG. 4C illustrates a positional relationship between the magnetic pole of the stator coil and the magnetic pole of the rotor at an electrical angle of 0°. FIG. 4A illustrates a state at the start of kicking, FIG. 4B illustrates a state at the time of the torque increase to maximum after the start of kicking, and FIG. 4C illustrates a state at the time of the torque decrease to zero after reaching the maximum torque. Here, the electrical angle of 0° in FIG. 4C is a stop position of the rotor.

For example, an example of the kicking performed in accordance with the energization pattern F based on the position of the rotor detected in the inductive sensing of Mode 1 will be described. In this case, as illustrated in FIG. 4A, in a state where the torque is 0 at an electrical angle of 120° ahead, application of a current from the W phase to the V phase is started in accordance with the energization pattern F. That is, a current is caused to flow from the W-phase stator coil 301W to the V-phase stator coil 301V. As a result, the torque in a rotation direction illustrated in FIG. 4A is applied to the rotor 303, and the torque increases. In this case, note that the sign of the back electromotive force generated in the U phase which is the non-energized phase is positive.

Next, as illustrated in FIG. 4B, a time corresponding to an electrical angle of 30° elapses from the state of FIG. 4A (a state at an electrical angle of 90° ahead is caused). In this example, since "electrical angle=2×mechanical angle" is set, the rotor 303 rotates by a mechanical angle of 15° from the state of FIG. 4A. The torque increases as the processing proceeds from FIG. 4A to FIG. 4B, and the torque applied to the rotor 303 becomes maximum in FIG. 4B (at an electrical angle of 90°) For example, the position at an electrical angle of 90° is a cogging stop position in the IPM motor. Note that the back electromotive force generated in the U phase which is the non-energized phase becomes substantially zero.

Next, as illustrated in FIG. 4C, a time corresponding to an electrical angle of 90° further elapses from the state of FIG. 4B (a state at an electrical angle of 0° is caused). That is, the rotor 303 further rotates by a mechanical angle of 45° from the state of FIG. 4B. The torque decreases as the processing proceeds from FIG. 4B to FIG. 4C, and the torque applied to the rotor 303 becomes zero in FIG. 4C. The position at an electrical angle of 0° (the torque of 0) is a magnetic excitation position. Note that the back electromotive force of the U phase which is the non-energized phase has a negative peak value (the magnetic flux becomes substantially zero)

<Outline of Motor Drive Control>

Figure 5:
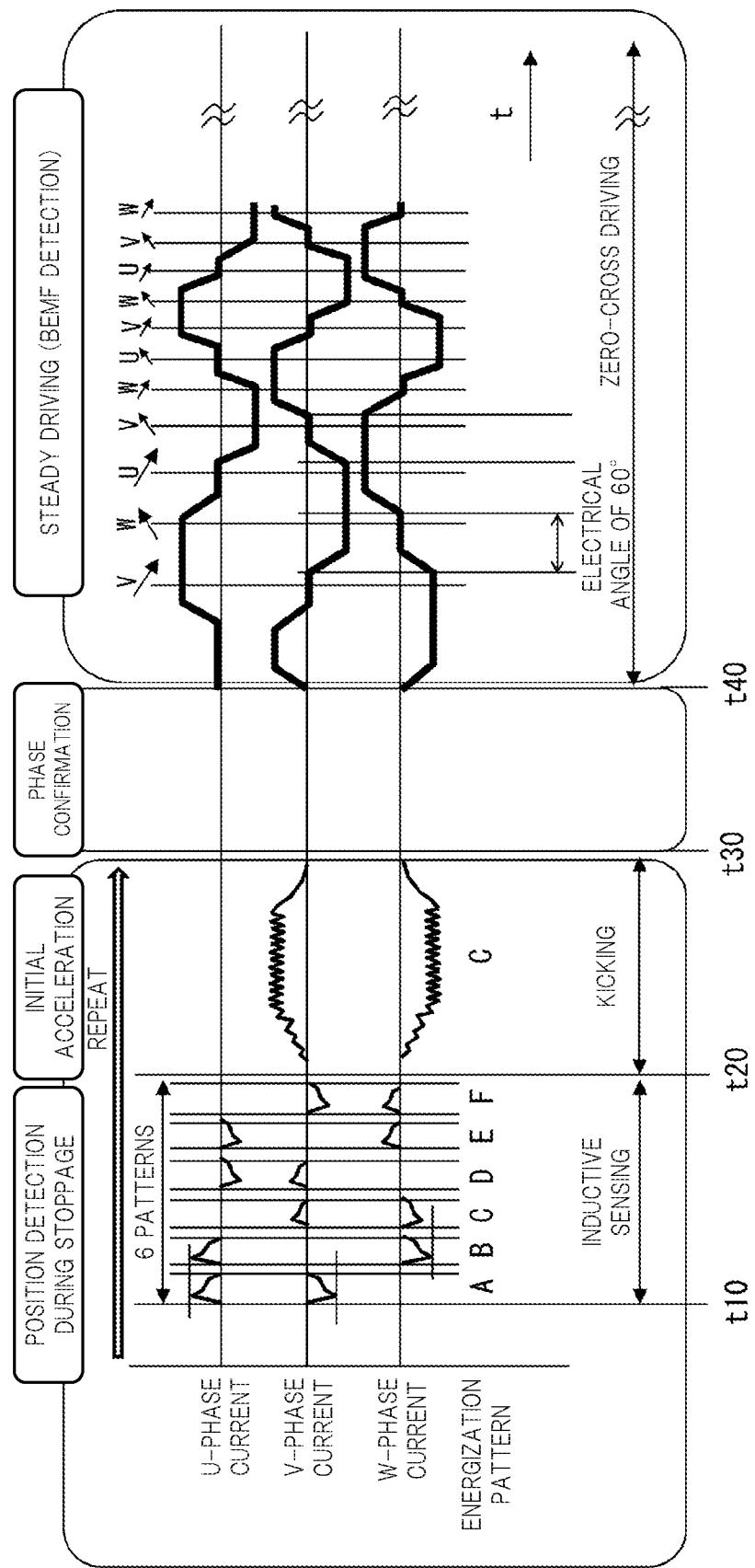
FIG. 5 is a current waveform diagram for describing an outline of drive control of the brushless DC motor according to the first embodiment.

Next, an outline of the motor drive control according to the present embodiment will be described. FIG. 5 illustrates an example of a motor current waveform during the steady driving based on the back electromotive force performed from the position detection during stoppage in the motor drive system 1. In FIG. 5, the energization patterns A to F are illustrated to correspond to the current waveforms of the respective phases. In FIG. 5, note that the length of the horizontal axis is not proportional to the actual time.

The motor is in a stopped state before time t10 in FIG. 5. A period from time t10 to time t20 corresponds to Mode 1. In this period, the MCU 110 detects the position of the rotor in accordance with the inductive sensing.

Specifically, the MCU 110 applies the wave detection current to the stator coil 301 in accordance with the six energization patterns A to F in this order by controlling the inverter circuit 200. In this case, the current applied to the motor and the application time thereof are limited to the extent that the rotor does not rotate.

During a rotor position detection (inductive sensing) period, the MCU 110 causes the shunt resistor 203 and the current detection circuit 102 to detect the magnitude of the wave detection current generated in the corresponding stator coil. The semi conductor device 100 detects the position of the rotor based on the result of detecting the wave detection current. Specifically, the detected motor current value is maximized when the magnetic pole of the stator coil 301 of the energized phase to be close to the rotor side and the magnetic pole of the rotor at a position facing the stator coil 301 attract each other. In the example of FIG. 5, the magnitudes (absolute values) of the U-phase current and the V-phase current, or the U-phase current and the W-phase current are maximized in the energization pattern A or B.

The next period from time t20 to time t30 corresponds to Mode 2. In this period, the MCU 110 controls the inverter circuit 200 to apply (kick) the startup torque to the brushless DC motor 300 for the initial acceleration. In this case, the MCU 110 determines an energization pattern (startup energization pattern) based on the position of the rotor detected based on the inductive sensing in such a way that the applied torque is as high as possible. In the example of FIG. 5, a current (startup torque) is applied to the stator coil 301 in accordance with the energization pattern C corresponding to an electrical, angle of 60° ahead or an electrical angle of 120° ahead, rather than the energization pattern A or B (at this time, the applied torque is substantially zero) corresponding to the detected rotor position. Note that a method of determining the startup energization pattern according to the present embodiment will be described later.

During the application of the startup torque, the MCU 110 detects the magnitude of the back electromotive force (or the mutual inductive voltage) generated in the non-energized phase by using the BEMF detection circuit 101. More specifically, after applying the startup torque for an initial application time T0 (for example, a time during which the rotor does not rotate by 60° under no load), the MCU 110 starts comparing the magnitude of the back electromotive force with a threshold value, and stops applying the startup torque when the magnitude of the back electromotive force exceeds the threshold value. The reason why the initial application time T0 is provided is that the back electromotive force is 0 when the rotor is stopped. The MCU 110 performs the initial acceleration when a time from the start of the application of the startup torque to a period in which the back electromotive force exceeds the threshold value (that is, to the stop of the application of the current) becomes equal to or less than a minimum application time Tmin in the MCU 110.

When the rotor starts to rotate by the kicking, the MCU 110 initially accelerates the rotation of the rotor until the rotation speed reaches an arbitrary rotation speed. For example, the MCU 110 increases the voltage (current) applied from the inverter circuit 200 to the stator coil 301 by using the energization pattern in the last kicking. After the inductive sensing and the kicking (initial acceleration) are repeated, phase confirmation is performed in the next period from time t30 to time t40.

Then, in a period after time t40, the MCU 110 performs sensorless driving (steady driving) of the brushless DC motor 300, based on zero-cross detection of the back electromotive force. The period after time t40 corresponds to Mode 3. Specifically, the MCU 110 determines an energization pattern for the next time, based on the energization pattern in the last kicking or the energization pattern in the initial acceleration. The MCU 110 controls the inverter circuit 200 in such a way that the motor current is caused to flow in accordance with the determined energization pattern for each electrical angle of 60°. For example, a pulse width modulation (PWM) signal is output as the energization control signal to the inverter circuit 200 to perform PWM control. At this time, the MCU 110 detects a zero-cross point of the back electromotive force generated in the non-energized phase by using the BEMF detection circuit 101. Then, the energization pattern is sequentially switched to apply the motor current.

<Motor Drive Control Flow>

Next, a flow of the motor drive control according to the present embodiment will be further described. FIG. 6 illustrates an example of the drive control of the brushless DC motor in the motor drive system 1.

In the motor drive system 1, the control flow in FIG. 6 may be started in a state in which the brushless DC motor 300 is rotating. For example, in a system that drives a fan, the fan may continue to rotate before startup. Therefore, the MCU 110 first determines whether or not the brushless DC motor 300 is being driven (rotating) (S101). For example, the MCU 110 determines whether or not an output of the AD converter 112 is larger than [threshold value "Th"+hysteresis amount "his" (for example, −10)]. That is, the MCU 110 determines whether or not the BEMF detection circuit 101 has detected a back electromotive force Larger than the [threshold value+hysteresis amount].

In Step S101, when the output of the AD converter 112 is equal to or smaller than the [threshold value Th+hysteresis amount his], that is, when the rotor is in the stopped state (S101/No), the determination during the driving is repeated until the output of the AD converter 112 exceeds the [threshold value Th+hysteresis amount his].

When the output of the AD converter 112 becomes larger than the [threshold value Th+hysteresis amount his] in Step S101 (S101/Yes) that is, when the rotor is in a rotating state, the MCU 110 instantaneously applies brake to the brushless DC motor 300 (S102). That is, the MCU 110 applies the brake to the brushless DC motor 300 by controlling the upper arm MOS transistors of two phases or the lower arm MOS transistors of two phases of the inverter circuit 200 to be in the ON state and controlling the others to be in the OFF state. In addition, the MCU 110 may apply the brake to the brushless DC motor 300 by turning off all the six MOS transistors of the inverter circuit 200 to achieve a three-phase high impedance state.

Next, the MCU 110 determines the back electromotive forces of the three phases in the brushless DC motor 300 (S103). That is, the MCU 110 determines whether or not the BEMF detection circuit 101 has detected the back electromotive forces of the three phases. For example, it is determined whether or not amplitudes of the back electromotive forces of the three phases are smaller than a threshold value, and then, if any of the back electromotive forces of the three phases has an amplitude, it is determined whether the rotor rotates in a forward direction (forward rotation) or a reverse direction (reverse rotation), based on the back electromotive forces of the respective phases.

In Step S103, if the amplitudes of the back electromotive forces of the three phases are smaller than the threshold value, that is, if the rotor is in the stopped state, the MCU 110 performs the inductive sensing operation (S104). The MCU 110 performs the inductive sensing to detect the position of the rotor in a state in which the brushless DC motor 300 is stopped. As indicated by time t10 to time t20 in FIG. 5, the MCU 110 controls the inverter circuit 200 to cause the wave detection current of each of the energization patterns A to F to flow to the stator coil 301. The MCU 110 estimates the position of the stator coil, based on the energization pattern when the maximum wave detection current is obtained.

Next, the MCU 110 performs the kicking operation based on the detection result of the inductive sensing (S105). As described later, the MCU 110 determines the startup energization pattern for applying the startup torque, based on the position of the rotor estimated in the stopped state. As indicated by time t20 to time t30 in FIG. 5, the MCU 110 determines, for example, a startup energization pattern corresponding to an electrical angle of 60° or 120° ahead of the detected rotor position and an output voltage (current) of the inverter circuit 200 at that time. The MCU 110 controls the inverter circuit 200 to start applying a current (startup torque) to the stator coil 301 in accordance with the determined startup energization pattern.

Then, the MCU 110 initially accelerates the brushless DC motor 300 (S106). The MCU 110 starts application of the startup torque to the stator coil 301, and starts detection of the back electromotive force by using the BEMF detection circuit 101 when the initial application time T0 has elapsed from the start of the application. The MCU 110 determines whether or not the back electromotive force exceeds the threshold value during a period from the application of the startup torque to the initial application time T0. If the back electromotive force does not exceed the threshold value until the elapse of the initial application time T0 (if the initial application time T0 times out), the processing returns to Step S104 since the rotor is in the stopped state, and the inductive sensing is performed again.

If the back electromotive force exceeds the threshold value before the elapse of the initial application time T0, the rotation of the rotor is initially accelerated until the rotation speed reaches an arbitrary rotation speed as shown from time t20 to time t30 in FIG. 5 since the rotor starts to rotate.

If the rotor rotates forward in Step S103, or if the rotation speed of the rotor has reached the arbitrary rotation speed in Step S106, the MCU 110 performs the zero-cross detection of the back electromotive force (S107). That is, as shown in the period after time t40 in FIG. 5, the MCU 110 performs the steady driving operation based on the zero-cross detection.

Next, the MCU 110 determines whether or not the brushless DC motor 300 is in the stopped state (S108). For example, the MCU 110 determines whether or not the output of the AD converter 112 is smaller than the threshold value Th. That is, the MCU 110 determines whether or not the BEMF detection circuit 101 has detected the back electromotive force smaller than the threshold value Th. The threshold value Th may be the same value as or a different value from the threshold value in Step S101. In Step S108, if the output of the AD converter 112 is equal to or larger than the threshold value Th (S108/No), that is, if the rotor is in the rotating state, the steady driving operation based on the zero-cross detection is repeated.

In Step S108, if the output of the AD converter 112 is smaller than threshold value Th (S108/Yes), that is, if the rotor is in the stopped state, the MCU 110 applies three-phase short brake to the brushless DC motor 300 (S109) The MCU 110 applies the brake to the brushless DC motor 300 by controlling the upper arm MOS transistors of three phases or the lower arm MOS transistors of three phases of the inverter circuit 200 to be in the ON state and controlling the other to be in the OFF state. In Step S103, three-phase short braking control is also performed even if the rotor is rotating in the reverse direction.

Next, the MCU 110 determines whether or not the brushless DC motor 300 is in the stopped state (S110). For example, the MCU 110 determines whether or not the BEMF detection circuit 101 has detected the amplitudes of the back electromotive forces of the three phases are equal to or smaller than a threshold value (for example, 10 LSB). In Step S110, if the amplitudes of the back electromotive forces are larger than the threshold value (S110/No), the stop determination is repeated until the amplitudes of the back electromotive forces become equal to or smaller than the threshold value since the rotor is in the rotating state. In Step S110, if the amplitudes of the back electromotive forces are equal to or smaller than the threshold value (S110/Yes), the processing returns to S101 to perform the drive determination since the rotor is in the stopped state.

<Inductive Sensing Flow>

Next, details of the inductive sensing operation according to the present embodiment will be described. FIGS. 7A to 7D are flowcharts illustrating a detailed flow of the inductive sensing operation. FIG. 8 is a current waveform diagram illustrating an operation example of the inductive sensing operation. Here, as the inductive sensing operation, operations from the detection of the wave detection current to the detection of the position of the rotor and the determination of the startup energization pattern (for example, operations of a part of S104 and S105 in FIG. 6) will be described.

Figure 7A:
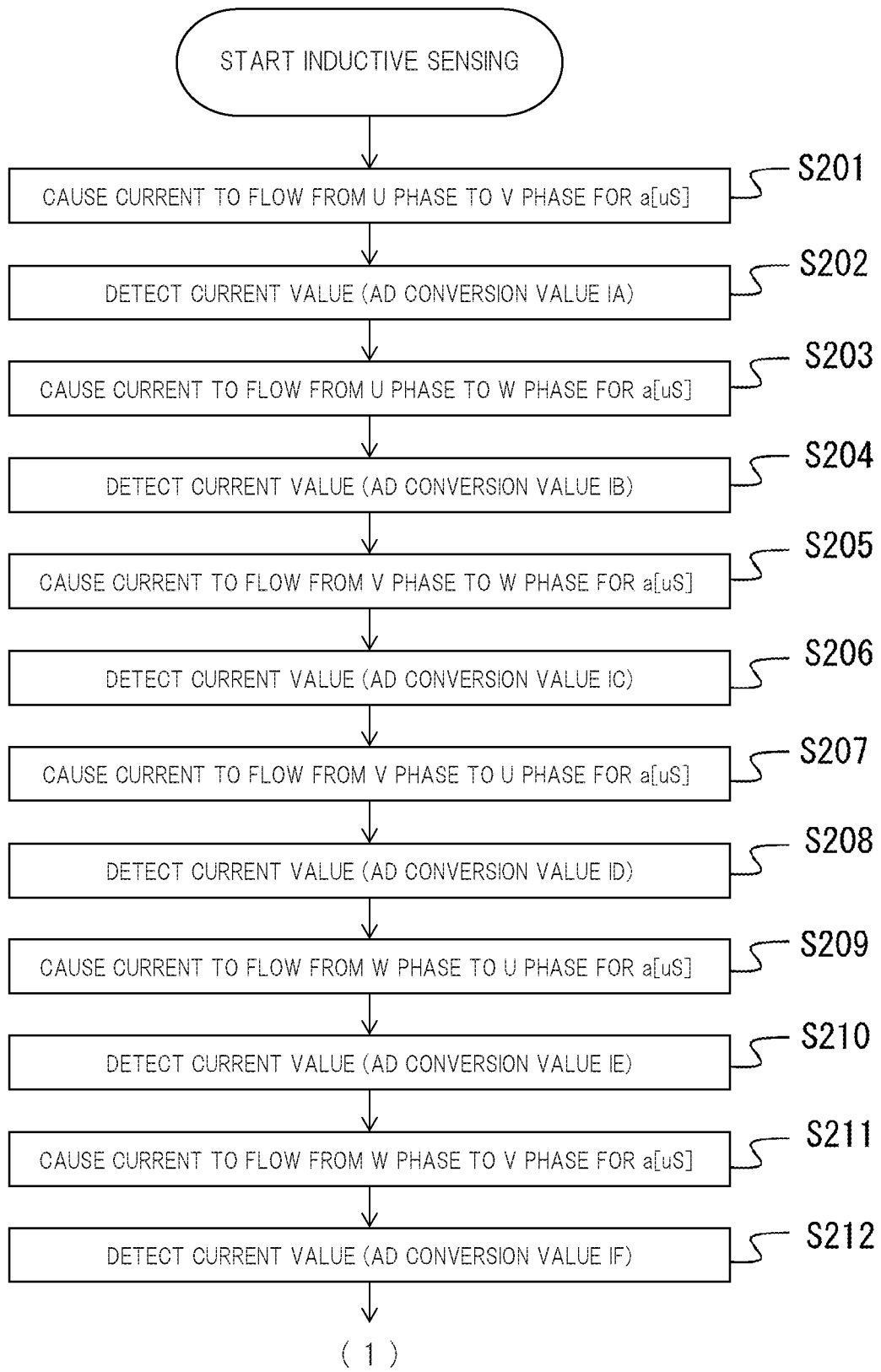
FIG. 7A is a flowchart illustrating a flow of an inductive sensing operation of the brushless DC motor according to the first embodiment.
Figure 8:
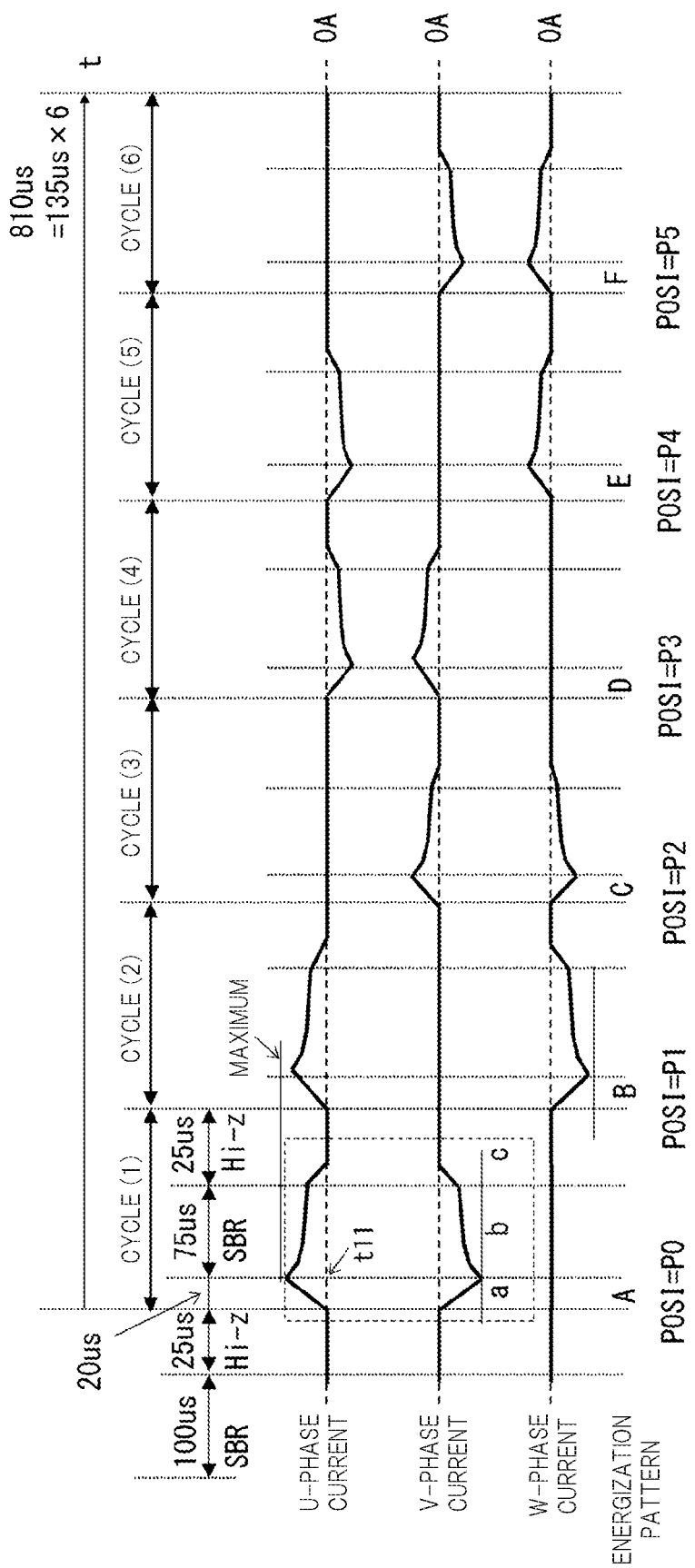
FIG. 8 is a current waveform diagram illustrating an operation example of the inductive sensing operation of the brushless DC motor according to the first embodiment.

As illustrated in FIGS. 7A and 8, in the inductive sensing operation, first, the MACU 110 sequentially causes the flow of the detection current between the phases in accordance with the six energization patterns, and detects each current value (S201 to S212).

Specifically, the MCU 110 controls the inverter circuit 200 to cause a current to flow from the U phase to the V phase in accordance with the energization pattern A (S201) The MCU 110 causes the wave detection current IA to flow from the U-phase stator coil 301U to the V-phase stator coil. 301V by controlling the U-phase upper arm MOS transistor UH and the V-phase lower arm MOS transistor VL of the inverter circuit 200 to be in the ON state and controlling the others to be in the OFF state. At this time, the MCU 110 performs control in such a way that the wave detection current IA is caused to flow for a period that is not enough to rotate the rotor.

As illustrated in FIG. 8, first, the MCU 110 applies short braking (for example, 100 µs) to turn off (cause Hi-z, high impedance state) all the MOS transistors of the inverter circuit 200 (for example, for 25 µs), and then, performs energization control in accordance with the energization pattern A in a first cycle. In the energization control in accordance with each energization pattern, the MCU 110 controls energization in the order of an energization period "a", a short-circuit period "b", and a non-energization period "c". For example, the energization period a is 20 µs, the short-circuit period is 75 µs, and the non-energization period c is 25 µs. In this case, a time corresponding to six cycles is 810 µs.

In the energization period a, the MCU 110 causes the flow of the wave detection current IA in accordance with the energization pattern A as described above. As a result, the detection current IA (the U-phase current in the positive direction and the V-phase current in the negative direction) increases during the energization period a. In the next short-circuit period b, the MCU 110 short-circuits the V-phase stator coil 301V and the W-phase stator coil 301W by controlling the V-phase lower arm MOS transistor VL and the W-phase lower arm MOS transistor WL to be in the ON state and controlling the others to be in the OFF state. As a result, the wave detection current IA (the U-phase current in the positive direction and the V-phase current in the negative direction) gradually decreases during the short-circuit period b. In the next non-energization period c, the MCU 110 controls all the MOS transistors to be in the OFF state (Hi-z) As a result, the wave detection current IA (the U-phase current in the positive direction and the V-phase current in the negative direction) becomes 0. When all the MOS transistors are turned off immediately after the current flows in the energization period a, a possibility that is the current flow to a power supply side to damage the circuit arises. Therefore, the current is gradually reduced by short-circuiting the stator coil before turning off all the MOS transistors.

Next, the MCU 110 detects a current value of the current flowing from the U phase to the V phase (S202). The MCU 110 causes the AD converter 113 to perform AD-conversion on the detection value output from the current detection circuit 102 in accordance with the wave detection current TA flowing in accordance with the energization pattern A in Step S201, and acquires the AD-converted value as the current value of the detection current IA. For example, the MCU 110 stores the maximum current value (the absolute value of the U-phase current or the V-phase current) of the wave detection current IA detected in the energization period a into the memory 111. In the first cycle of FIG. 8, since the absolute value of the U-phase current or the V-phase current is maximized at the last time t11 of the energization period a, the absolute value of the U-phase current or the V-phase current at this time is stored in the memory 111. As illustrated in FIG. 8, the position (POSI) of the rotor corresponding to the energization pattern A, that is, the position of the rotor estimated (detected) when the wave detection current IA is the largest as compared with other detection currents is set to P0.

In this example, note that the AD conversion result (the voltage of the shunt resistor) of the output of the differential amplifier 150 is used as the current value (the value corresponding to the current). The present invention is not limited thereto, and the current value may be obtained from the AD conversion result of the output of the differential amplifier 150 and a resistance value of the shunt resistor 203. The same applies to a case of obtaining currents of other energization patterns.

Next, the MCU 110 controls the inverter circuit 200 to cause a current to flow from the U phase to the W phase in accordance with the energization pattern B (S203) The MCU 110 causes the flow of the wave detection current IB from the U-phase stator coil 301U to the W-phase stator coil 301W by controlling the U-chase upper arm MOS transistor UH and the W-phase lower arm MOS transistor WL of the inverter circuit 200 to be in the ON state and controlling the others to be in the OFF state. For example, as similar to the case of the energization pattern A, the MCU 110 controls the energization of the wave detection current IB (the U-phase current in the positive direct on and the W-phase current in the negative direction) in the order of an energization period a, a short-circuit period b, and a non-energization period c in a second cycle of the example of FIG. 8.

Next, the MCU 110 detects a current value of the current flowing from the U phase to the W phase (S204). The MCU 110 causes the AD converter 113 to perform AD conversion on the detection value output from the current detection circuit 102 in accordance with the wave detection current IB flowing in accordance with the energization pattern B in Step S203, and acquires the AD-converted value as the current value of the wave detection current IB. For example, as similar to the case of the energization pattern A, the MCU 110 stores the maximum current value (the absolute value of the U-phase current or the W-phase current) of the wave detection current IB detected in the energization period a into the memory 111. As illustrated in FIG. 8, the position (POSI) of the rotor corresponding to the energization pattern B is set to P1.

Next, the MCU 110 controls the inverter circuit 200 to cause a current to flow from the V phase to the W phase in accordance with the energization pattern C (S205) The MCU 110 causes the flow of the wave detection current IC from the V-phase stator coil 301V to the W-phase stator coil 301W by controlling the V-phase upper arm MOS transistor VH and the W-phase lower arm MOS transistor WL of the inverter circuit 200 to be in the ON state and controlling the others to be in the OFF state. For example, as similar to the case of the energization pattern A, the MCU 110 controls the energization of the wave detection current IC (the V-phase current in the positive direction and the W-phase current in the negative direction) in the order of an energization period a, a short-circuit period b, and a non-energization period c in a third cycle of the example of FIG. 3.

Next, the MCU 110 detects a current value of the current flowing from the V phase to the W phase (S206). The MCU 110 causes the AD converter 113 to perform AD conversion on the detection value output from the current detection circuit 102 in accordance with the wave detection current IC flowing in accordance with the energization pattern C in Step S205, and acquires the AD-converted value as the current value of the wave detection current IC. For example, as similar to the case of the energization pattern A, the MCU 110 stores the maximum current value (the absolute value of the V-phase current or the W-phase current) of the wave detection current IC detected in the energization period a into the memory 111. As illustrated in FIG. 8, the position (POSI) of the rotor corresponding to the energization pattern C is set to P2.

Next, the MCU 110 controls the inverter circuit 200 to cause a current to flow from the V phase to the U phase in accordance with the energization pattern D (S207). The MCU 110 causes the flow of the wave detection current ID from the V-phase stator coil 301V to the U-phase stator coil 301U by controlling the V-phase upper arm MOS transistor VH and the U-phase lower arm MOS transistor UL of the inverter circuit 200 to be in the ON state and controlling the others to be in the OFF state. For example, as similar to the case of the energization pattern A, the MCU 110 controls the energization of the wave detection current ID (the V-phase current in the positive direction and the U-phase current in the negative direction) in the order of an energization period a, a short-circuit period b, and a non-energization period c in a fourth cycle of the example of FIG. 8.

Next, the MCU 110 detects a current value of the current flowing from the V phase to the U phase (S208) The MCU 110 causes the AD converter 113 to perform AD conversion on the detection value output from the current detection circuit 102 in accordance with the wave detection current ID flowing in accordance with the energization pattern D in Step S207, and acquires the AD-converted value as the current value of the wave detection current 7D. For example, as similar to the case of the energization pattern A, the MCU 110 stores the maximum current value (the absolute value of the V-phase current or the U-phase current) of the wave detection current ID detected in the energization period a into the memory 111. As illustrated in FIG. 8, the position (POSI) of the rotor corresponding to the energization pattern D is set to P3.

Next, the MCU 110 controls the inverter circuit 200 to cause a current to flow from the W phase to the U phase in accordance with the energization pattern E (S209). The MCU 110 causes the flow of the wave detection current IE from the W-phase stator coil 301W to the U-phase stator coil 301U by controlling the W-phase upper arm MOS transistor WH and the U-phase lower arm MOS transistor UL of the inverter circuit 200 to be in the ON state and controlling the others to be in the OFF state. For example, as similar to the case of the energization pattern A, the MCU 110 controls the energization of the wave detection current IE (the W-phase current in the positive direction and the U-phase current in the negative direction) in the order of an energization period a, a short-circuit period b, and a non-energization period c in a fifth cycle of the example of FIG. 8.

Next, the MCU 110 detects a current value of the current flowing from the W phase to the U phase (S210). The MCU 110 causes the AD converter 113 to perform AD conversion on the detection value output from the current detection circuit 102 in accordance with the wave detection current IE flowing in accordance with the energization pattern E in Step S209, and acquires the AD-converted value as the current value of the wave detection current IE. For example, as similar to the case of the energization pattern A, the MCU 110 stores the maximum current value (the absolute value of the W-phase current or the U-phase current) of the wave detection current IF detected in the energization period a into the memory 111. As illustrated in FIG. 8, the position (POSI) of the rotor corresponding to the energization pattern E is set to P4.

Next, the MCU 110 controls the inverter circuit 200 to cause a current to flow from the W phase to the V phase in accordance with the energization pattern F (S211). The MCU 110 causes the flow of the wave detection current IF from the W-phase stator coil 301W to the V-phase stator coil 301V by controlling the W-phase upper arm MOS transistor WH and the V-phase lower arm MOS transistor VL of the inverter circuit 200 to be in the ON state and controlling the others to be in the OFF state. For example, as similar to the case of the energization pattern A, the MCU 110 controls the energization of the wave detection current IE (the W-phase current in the positive direction and the V-phase current in the negative direction) in the order of an energization period a, a short-circuit period b, and a non-energization period c in a sixth cycle of the example of FIG. 8.

Next, the MCU 110 detects a current value of the current flowing from the W phase to the V phase (S212). The MCU 110 causes the AD converter 113 to perform AD conversion on the detection value output from the current detection circuit 102 in accordance with the wave detection current IF flowing in accordance with the energization pattern F in Step S211, and acquires the AD-converted value as the current value of the wave detection current IF. For example, as similar to the case of the energization pattern A, the MCU 110 stores the maximum current value (the absolute value of the W-phase current or the V-phase current) of the wave detection current IF detected in the energization period a into the memory 111. As illustrated in FIG. 8, the position (POSI) of the rotor corresponding to the energization pattern F is set to P5.

Figure 7B:
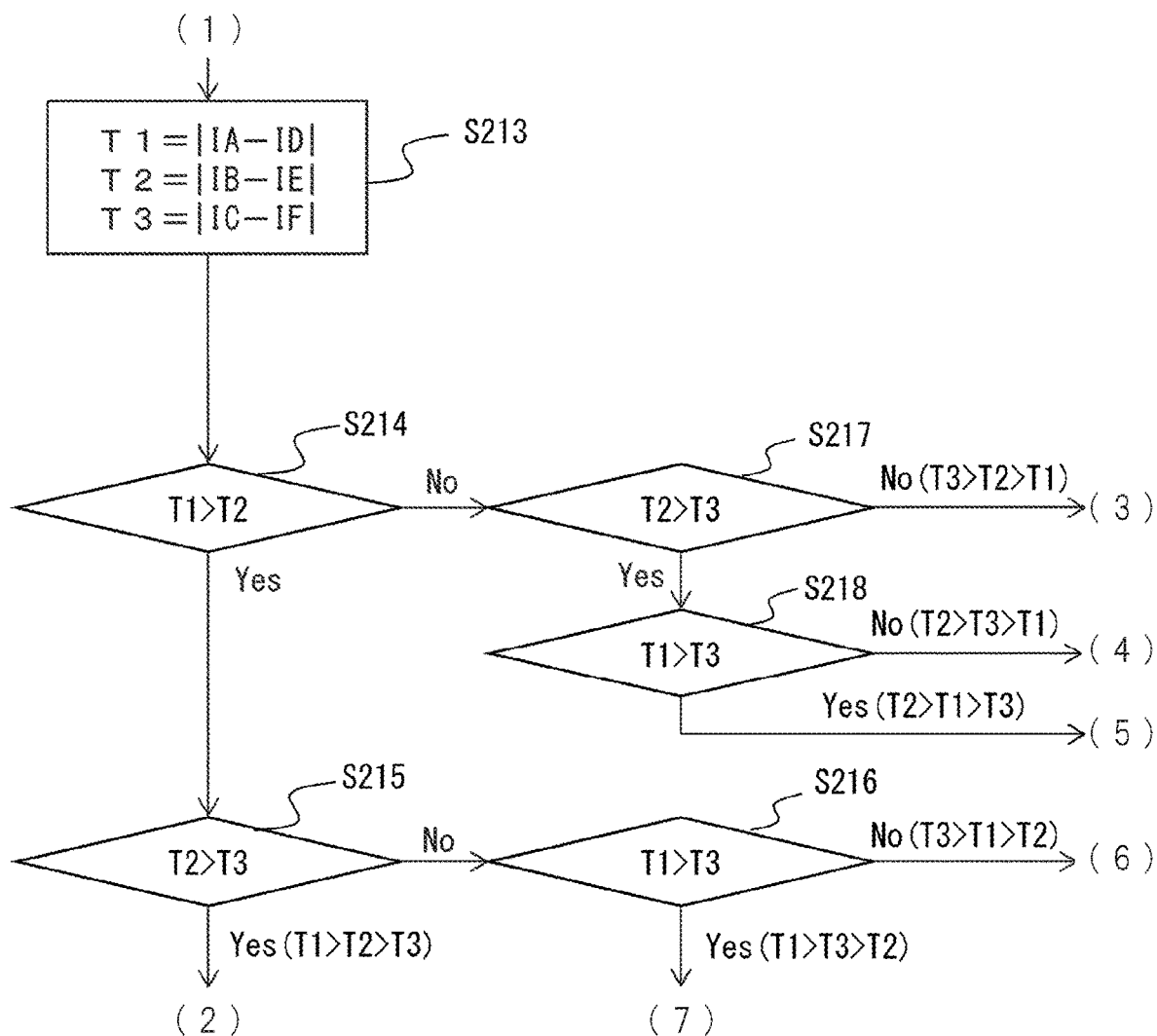
FIG. 7B is a flowchart illustrating a flow of the inductive sensing operation of the brushless DC motor according to the first embodiment.

Next, as illustrated in FIG. 7B, the MCU 110 obtains a difference between the detected current values (S213). The MCU 110 acquires the current values of the wave detection currents IA to IF detected in Steps S201 to S212 and stored in the memory 111, and obtains a difference (interphase current difference) between two wave detection currents in the energization patterns in opposite directions (current patterns flowing in opposite directions) for each interphase.

Specifically, the MCU 110 obtains an absolute value of a difference between the wave detection current 1A flowing from the U phase to the V phase in accordance with the energization pattern and the wave detection current ID flowing from the V phase to the U phase in accordance with the opposite energization pattern D, and sets the obtained value as an interphase current difference T1 (for example, a first interphase current difference). Further, the MCU 110 obtains an absolute value of a difference between the wave detection current IB flowing from the U phase to the W phase in accordance with the energization pattern B and the wave detection current IE flowing from the W phase to the U phase in accordance with the opposite energization pattern E, and sets the obtained value as an interphase current difference T2 (for example, a second interphase current difference). Further, the MCU 110 obtains an absolute value of a difference between the wave detection current IC flowing from the V phase to the W phase in accordance with the energization pattern C and the wave detection current IF flowing from the W phase to the V phase in accordance with the energization pattern F having the opposite direction, and sets the obtained value as an interphase current difference T3 (for example, a third interphase current difference) Next, as illustrated in FIG. 7B, the MCU 110 determines a magnitude relationship among the plurality of obtained interphase current differences (S214 to S218). The MCU 110 compares the obtained interphase current differences T1, T2, and T3, and determines a magnitude relationship among the three interphase current differences. FIG. 7B is an example, and the magnitude relationship among the interphase current differences may be determined in other steps.

Specifically, the MCU 110 compares the interphase current difference T1 and the interphase current difference T2, and determines whether or not the interphase current difference T1 is larger than the interphase current difference T2 (S214). If it is determined in Step S214 that the interphase current difference T1 is larger than the interphase current difference T2 (S241/Yes), the MCU 110 compares the interphase current difference T2 with the interphase current difference T3 and determines whether or not the interphase current difference T2 is larger than the interphase current difference T3 (S215). If it is determined in Step S215 that the interphase current difference T2 is larger than the interphase current difference T3 (S215/Yes), the MCU 110 determines a relationship of "Interphase current difference T1 >interphase current difference T2>Interphase current difference T3".

If it is determined in Step S215 that the interphase current difference T2 is equal to or smaller than the interphase current difference T3 (S215/No), the MCU 110 compares the interphase current difference T1 with the interphase current difference T3 and determines whether or not the interphase current difference T1 is larger than the interphase current difference T3 (S216). If it is determined in Step S216 that the interphase current difference T1 is larger than the interphase current difference T3 (S216/Yes), the MCU 110 determines a relationship of "Interphase current difference T1>Interphase current difference T3>Interphase current difference T2". If it is determined in Step S216 that the interphase current difference T1 is equal to or smaller than the interphase current difference T3 (S216/No), the MCU 110 determines a relationship of "Interphase current difference 13>Interphase current difference T1>Interphase current difference T2".

If it is determined in Step S214 that the interphase current difference T1 is equal to or smaller than the interphase current difference T2 (S214/No), the MCU 110 compares the interphase current difference T2 with the interphase current difference T3 and determines whether or not the interphase current difference T2 is larger than the interphase current difference T3 (S217). If it s determined in Step S217 that the interphase current difference T2 is equal to or smaller than the interphase current difference T3 (S217/No) the MCU 110 determines a relationship of "Interphase current difference T3>Interphase current difference T2>Interphase current difference T1".

If it is determined in Step S217 that the interphase current difference T2 is larger than the interphase current difference T3 (S217/Yes), the MCU 110 compares the interphase current difference T1 and the interphase current difference T3, and determines whether or not the interphase current difference T1 is larger than the interphase current difference T3 (S218) If it is determined in Step S218 that the interphase current difference T1 is larger than the interphase current difference T3 (S218/Yes), the MCU 110 determines a relationship of "Interphase current difference T2>Interphase current difference T1>Interphase current difference T3". If it is determined in Step S218 that the interphase current difference T1 is equal to or smaller than the interphase current difference T3 (S213/No), the MCU 110 determines a relationship of "Interphase current difference T2>Interphase current difference T3>Interphase current difference T1".

Figure 7C:
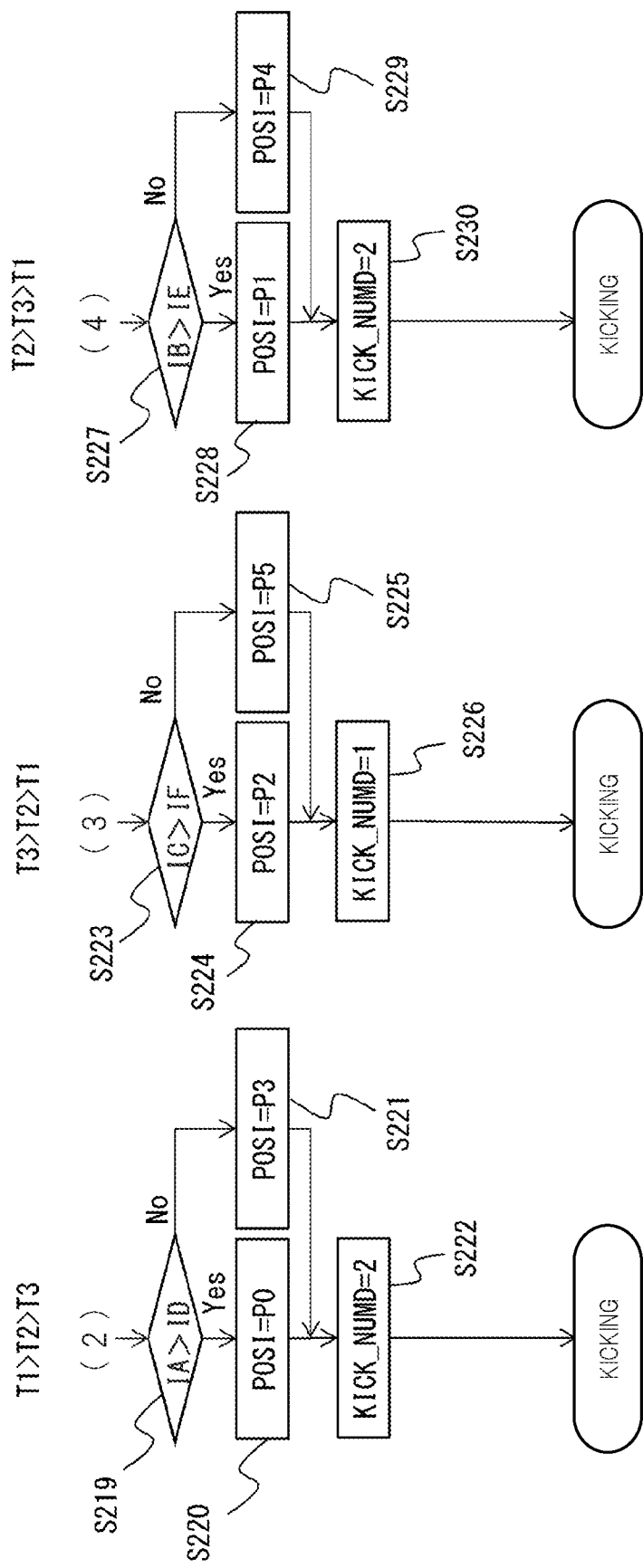
FIG. 7C is a flowchart illustrating a flow of the inductive sensing operation of the brushless DC motor according to the first embodiment.

Next, as illustrated in FIGS. 7C and 7D, the MCU 110 determines a detected position of the rotor and an addition parameter, based on the magnitude relationship among the interphase current differences (S219 to S242). The addition parameter (kicking parameter, KICK_NUMD) is a parameter for obtaining the energization pattern at the time of the kicking, and is a parameter added to the detected position (basic position or reference position) of the rotor. It can also be said that the addition parameter is a parameter added to the energization pattern (basic energization pattern or reference energization pattern) corresponding to the detected position. The addition parameter corresponds to the electrical angle of the brushless DC motor 300. For example, the addition parameter "1" corresponds to an angle such as the electrical angle of 60° for one energization pattern.

The MCU 110 determines the startup energization pattern at the time of initial driving by determining the addition parameter based on the magnitude relationship among the interphase current differences, and then, adding the addition parameter to the detected position of the rotor. It can also be said that the MCU 110 detects the position of the rotor based on the magnitude relationship among the interphase current differences, and determines the startup energization pattern based on the detected position of the rotor.

In this example, the MCU 110 detects the position of the rotor based on the largest interphase current difference among the interphase current differences T1, T2, and T3. In particular, the position of the rotor is detected based on a magnitude relationship between two currents from which the largest interphase current difference is calculated. The six wave detection currents may vary depending on the properties of the motor, the characteristics of the coils, and the like. However, since the position of the rotor is detected using the interphase current difference, it is possible to accurately detect the position of the rotor while suppressing the influence of the variation in the current value. In addition, the MCU 110 determines the addition parameter based on a magnitude relationship between two interphase current differences other than the largest interphase current difference among the interphase current differences T1, T2, and T3. The three interphase current differences may vary depending on the properties of the motor, the characteristics of the coils, and the like. However, since the magnitude relationship among the three interphase current differences is used, it is possible to appropriately determine the addition parameter while suppressing the influence of the variation in the interphase current difference.

Specifically, if the relationship of "interphase current difference T1>Interphase current difference T2>Interphase current difference T3" is determined (S215/Yes), the MCU 110 compares the wave detection current IA and the wave detection current ID, from which the interphase current difference T1 is calculated, and determines whether or not the wave detection current IA is larger than the wave detection current ID (S219). If it is determined in Step S219 that the wave detection current IA is larger than the wave detection current ID (S219/Yes), the MCU 110 determines P0 as the detected position (POSI) of the rotor (S220). It can also be said that the energization pattern A corresponding to the detected position P0 is determined as the basic energization pattern. If it is determined in Step S219 that the wave detection current IA is equal to or smaller than the wave detection current ID (S219/No), the MCU 110 determines P3 as the detected position (POSI) of the rotor (S221). It can also be said that the energization pattern D corresponding to the detected position P3 is determined as the basic energization pattern.

Next, the MCU 110 determines "2" as the addition parameter (KICK_NUMD) (S222). Here, since the interphase current difference T2 is larger than the interphase current difference T3, the addition parameter is set to "2". Accordingly, when the detected position of the rotor is PC (in the case of the basic energization pattern A), the MCU 110 sets the energization pattern C corresponding to the position P2 (a position corresponding to an electrical angle of 120° ahead) obtained by adding the addition parameter "2" to the detected position as the startup energization pattern at the time of the kicking. When the detected position of the rotor is P3 (in the case of the basic energization pattern D), the MCU 110 sets the energization pattern F corresponding to the position P5 (a position corresponding to an electrical angle of 120° ahead) obtained by adding the addition parameter "2" to the detected position as the startup energization pattern at the time of the kicking.

If the relationship of "Interphase current difference T3>Interphase current difference T2>Interphase current difference T1" is determined (S217/No), the MCU 110 compares the wave detection current IC and the wave detection current IF, from which the interphase current difference T3 is calculated, and determines whether or not the wave detection current IC is larger than the wave detection current IF (S223). If it is determined in Step S223 that the wave detection current IC is larger than the wave detection current IF (S223/Yes), the MCU 110 determines P2 as the detected position (POST) of the rotor (S224). It can also be said that the energization pattern C corresponding to the detected position P2 is determined as the basic energization pattern. If t is determined in Step S223 that the wave detection current IC is equal to or smaller than the wave detection current IF (S223/No), the MCU 110 determines P5 as the detected position (POSI) of the rotor (S225). It can also be said that the energization pattern F corresponding to the detected position P5 is determined as the basic energization pattern.

Next, the MCU 110 determines "1" as the addition parameter (KICK_NUMD) (S226). Here, since the interphase current difference T2 is larger than the interphase current difference T1, the addition parameter is set to "1". Accordingly, when the detected position of the rotor is P2 (in the case of the basic energization pattern C), the MCU 110 sets the energization pattern D corresponding to the position P3 (a position corresponding to an electrical angle of 60° ahead) obtained by adding the addition parameter "1" to the detected position as the startup energization pattern at the time of the kicking. When the detected position of the rotor is P5 (in the case of the basic energization pattern F), the MCU 110 sets the energization pattern A corresponding to the position P0 (a position corresponding to an electrical angle of 60° ahead) obtained by adding the addition parameter "1" to the detected position as the startup energization pattern at the time of the kicking.

If the relationship of "Interphase current difference T2>Interphase current difference T3>Interphase current difference T1" is determined (S218/No) the MCU 110 compares the wave detection current IB and the wave detection current IE, from which the interphase current difference T2 is calculated, and determines whether or not the wave detection current IB is larger than the wave detection current IE (S227). If it is determined in Step S227 that the wave detection current IB is larger than the wave detection current IE (S227/Yes), the MCU 110 determines P1 as the detected position (POSI) of the rotor (S228). It can also be said that the energization pattern B corresponding to the detected position P1 is determined as the basic energization pattern. If it is determined in Step S227 that the wave detection current IB is equal to or smaller than the wave detection current IE (S227/No), the MCU 110 determines P4 as the detected position (POSI) of the rotor (S229). It can also be said that the energization pattern E corresponding to the detected position P4 is determined as the basic energization pattern.

Next, the MCU 110 determines "2" as the addition parameter (KICK_NUMD) (S230). Here, since the interphase current difference T3 is larger than the interphase current difference T1, the addition parameter is set to "2". Accordingly, when the detected position of the rotor is P1 (in the case of the basic energization pattern B), the MCU 110 sets the energization pattern D corresponding to the position P3 (a position corresponding to an electrical angle of 120° ahead) obtained by adding the addition parameter "2" to the detected position as the startup energization pattern at the time of the kicking. When the detected position of the rotor is P4 (in the case of the basic energization pattern E), the MCU 110 sets the energization pattern A corresponding to the position P0 (a position corresponding to an electrical angle of 120° ahead) obtained by adding the addition parameter "2" to the detected position as the startup energization pattern at the time of the kicking.

If the relationship of "Interphase current difference T2>Interphase current difference T1>Interphase current difference T3" is determined (S218/Yes) the MCU 110 compares the wave detection current IB and the wave detection current IE, from which the interphase current difference T2 is calculated, and determines whether or not the wave detection current IB is larger than the wave detection current IE (S231). If it is determined in Step S231 that the wave detection current IB is larger than the wave detection current IE (S231/Yes), the MCU 110 determines P1 as the detected position (POST) of the rotor (S232). It can also be said that the energization pattern B corresponding to the detected position P1 is determined as the basic energization pattern. If it is determined in Step S231 that the wave detection current IB is equal to or smaller than the wave detection current IE (S231/No), the MCU 110 determines P4 as the detected position (POST) of the rotor (S233). It can also be said that the energization pattern E corresponding to the detected position P4 is determined as the basic energization pattern.

Next, the MCU 110 determines "1" as the addition parameter (KICK_NUMD) (S234). Here, since the interphase current difference T1 is larger than the interphase current difference T3, the addition parameter is set to "1". Accordingly, when the detected position of the rotor is P1 (in the case of the basic energization pattern B), the MCU 110 sets the energization pattern C corresponding to the position P2 (a position corresponding to an electrical angle of 60° ahead) obtained by adding the addition parameter "1" to the detected position as the startup energization pattern at the time of the kicking. When the detected position of the rotor is P4 (in the case of the basic energization pattern E), the MCU 110 sets the energization pattern F corresponding to the position P5 (a position corresponding to an electrical angle of 60° ahead) obtained by adding the addition parameter "1" to the detected position as the startup energization pattern at the time of the kicking.

If the relationship of "Interphase current difference T3>Interphase current difference T1>Interphase current difference T2" is determined (S216/No), the MCU 110 compares the wave detection current IC and the wave detection current IF, from which the interphase current difference T3 is calculated, and determines whether or not the wave detection current IC is larger than the wave detection current IF (S235). If it is determined in Step S235 that the wave detection current IC is larger than the wave detection current IF (S235/Yes), the MCU 110 determines P2 as the detected position (POSI) of the rotor (3236). It can also be said that the energization pattern C corresponding to the detected position P2 is determined as the basic energization pattern. If it is determined in Step S235 that the wave detection current IC is equal to or smaller than the wave detection current IF (S235/No), the MCU 110 determines P5 as the detected position (POSI) of the rotor (S237). It can also be said that the energization pattern F corresponding to the detected position P5 is determined as the basic energization pattern.

Next, the MCU 110 determines "2" as the addition parameter (KICK_NUMD) (S238). Here, since the interphase current difference T1 is larger than the interphase current difference T2, the addition parameter is set to "2". Accordingly, when the detected position of the rotor is P2 (in the case of the basic energization pattern C), the M-CU 110 sets the energization pattern E corresponding to the position P4 (a position corresponding to an electrical anole of 120° ahead) obtained by adding the addition parameter "2" to the detected position as the startup energization pattern at the time of the kicking. When the detected position of the rotor is P5 (in the case of the basic energization pattern F), the MCU 110 sets the energization pattern B corresponding to the position P1 (a position corresponding to an electrical angle of 120° ahead) obtained by adding the addition parameter "2" to the detected position as the startup energization pattern at the time of the kicking.

If the relationship of "Interphase current difference T1>Interphase current difference T3>Interphase current difference T2" is determined (S216/Yes), the MCU 110 compares the wave detection current IA and the wave detection current ID, from which the interphase current difference T1 is calculated, and determines whether or not the wave detection current IA is larger than the wave detection current ID (S239). If it is determined in Step S239 that the wave detection current IA is larger than the wave detection current ID (S239/Yes), the MCU 110 determines P0 as the detected position (POSI) of the rotor (S240). It can also be said that the energization pattern A corresponding to the detected position PC is determined as the basic energization pattern. If it is determined in Step S239 that the wave detection current IA is equal to or smaller than the wave detection current ID (S239/No), the MCU 110 determines P3 as the detected position (POST) of the rotor (S241). It can also be said that the energization pattern D corresponding to the detected position P3 is determined as the basic energization pattern.

Next, the MCU 110 determines "1" as the addition parameter (KICK_NUMD) (S242). Here, since the interphase current difference T3 is larger than the interphase current difference T2, the addition parameter is set to "1". Accordingly, when the detected position of the rotor is PC (in the case of the basic energization pattern A), the MCU 110 sets the energization pattern B corresponding to the position P1 (a position corresponding to an electrical angle of 60° ahead) obtained by adding the addition parameter "1" to the detected position as the startup energization pattern at the time of the kicking. When the detected position of the rotor is P3 (in the case of the basic energization pattern D), the MCU 110 sets the energization pattern E corresponding to the position P4 (a position corresponding to an electrical, angle of 60° ahead) obtained by adding the kick parameter "1" to the detected position as the startup energization pattern at the time of the kicking.

Effects of First Embodiment

Next, effects of the present embodiment will be described. Here, in order to compare with the present embodiment, an example in which the startup energization pattern is determined using only the largest interphase current difference among the interphase current differences T1, T2, and T3 in the inductive sensing will be described as a study example.

Figure 9:
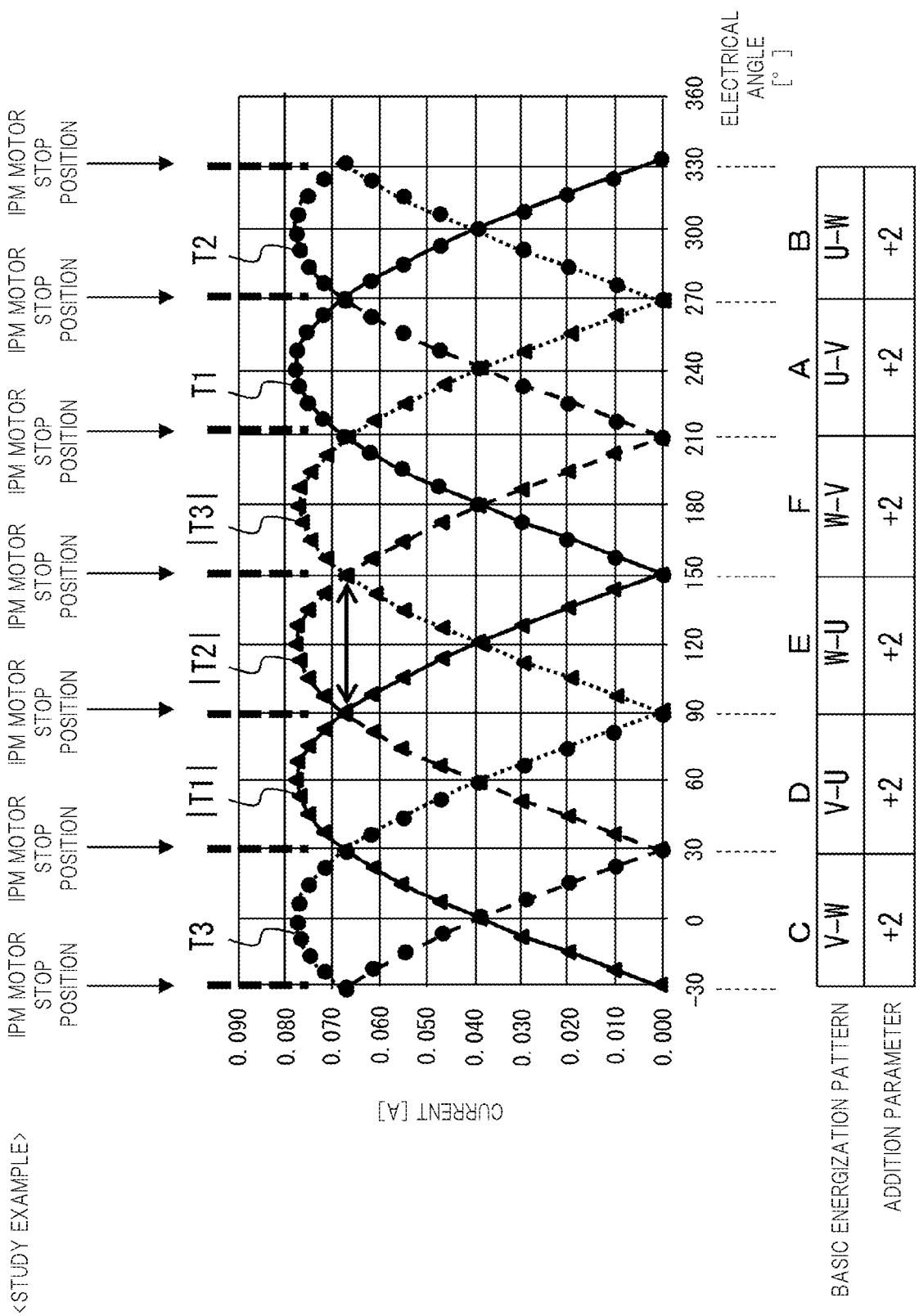
FIG. 9 is a diagram illustrating a relationship among an interphase current difference and an electrical angle of a brushless DC motor, a basic energization pattern, and an addition parameter in a study example.

FIG. 9 illustrates a relationship among the interphase current differences T1, T2, and T3 and the electrical angle, the basic energization pattern, and the addition parameter obtained from the interphase current differences in the study example. As illustrated in FIG. 9, when the interphase current differences T1, T2, and T3 (absolute values) are plotted with respect to the electrical angle, an upwardly convex parabola is repeated. The interphase current differences T1, T2, and T3 are each shifted by 60°. In FIG. 9, the interphase current difference T1 has the largest value at an electrical angle of 60° and an electrical angle of 240°, the interphase current difference T2 has the largest value at an electrical angle of 120° and an electrical angle of 300°, and the interphase current difference T3 has the largest value at an electrical angle of 0° and an electrical angle of 180°. With the relationship among the interphase current differences T1, T2, and T3 and the electrical angle, the electrical angle (the position of the rotor) can be detected based on the interphase current difference obtained from the wave detection currents detected in the inductive sensing.

In the study example, the position of the rotor is detected in a range of an electrical angle of 60° by selecting the largest interphase current difference among the interphase current differences T1, T2, and T3 obtained from the wave detection currents, and then, comparing the magnitudes of two wave detection currents, from which the selected interphase current difference Is calculated, and therefore, the basic energization pattern to be the reference is calculated from the detected position. Next, in the study example, the addition parameter of a fixed value (for example, +2 or +1) is added to the basic energization pattern obtained from the largest interphase current difference to obtain the startup energization pattern at the time of the kicking.

For example, if the rotor stops near an electrical angle of 120°, a value |T2| is the largest interphase current difference, and the wave detection current IF of the energization pattern F is larger than the wave detection current IB of the energization pattern B. In this case, in the study example, it is detected that the rotor is stopped between an electrical angle of 90° and an electrical angle of 150°, and the energization pattern E (POSI=P4) is obtained as the basic energization pattern from the detected position. Furthermore, in the study example, the fixed addition parameter "2" is added to the obtained basic energization pattern E (POSI=P4), and the energization pattern A (POSI=P0) is set as the startup energization pattern at the time of the kicking.

As described above, in the study example, for example, if the rotor stops near an electrical angle of 120°, the value T2 is obviously larger than the values |T1| and |T3|, and thus the determination result is stabilized. That is, in the study example, the largest interphase current difference is used to detect the position of the rotor at a resolution of an electrical angle of 60°, and the addition parameter of a fixed value is added to the detected position (energization pattern) in a range of an electrical angle of 60° to determine the startup energization pattern. However, in the study example, since the addition parameter of a fixed value is added to the detected position including an error range of an electrical angle of 60° at the maximum, the application of the startup torque in accordance with an appropriate startup energization pattern cannot be achieved depending on the stop position of the rotor, and a desired torque cannot be obtained.

In a case of the IPM motor, due to the influence of the cogging torque, the stop positions of the rotor that is not energized are positions of −30°, 30°, 90°, 150°, 210°, 270°, and 330° as illustrated in FIG. 9. These stop positions are boundary positions of the position detection range of the study example. Then, for example, if the rotor stops near an electrical angle of 150° that is the cogging stop position, the values |T2| and |T3| are approximated. For this reason, in the study example, a torque necessary for the startup in accordance with the startup energization pattern cannot be generated depending on the fixed value (for example, +2 or +1) of the addition parameter. Specifically, the torque generated in the motor in the study example is as illustrated in FIGS. 10A and 10B, and FIGS. 11A and 11B.

Figure 11B:
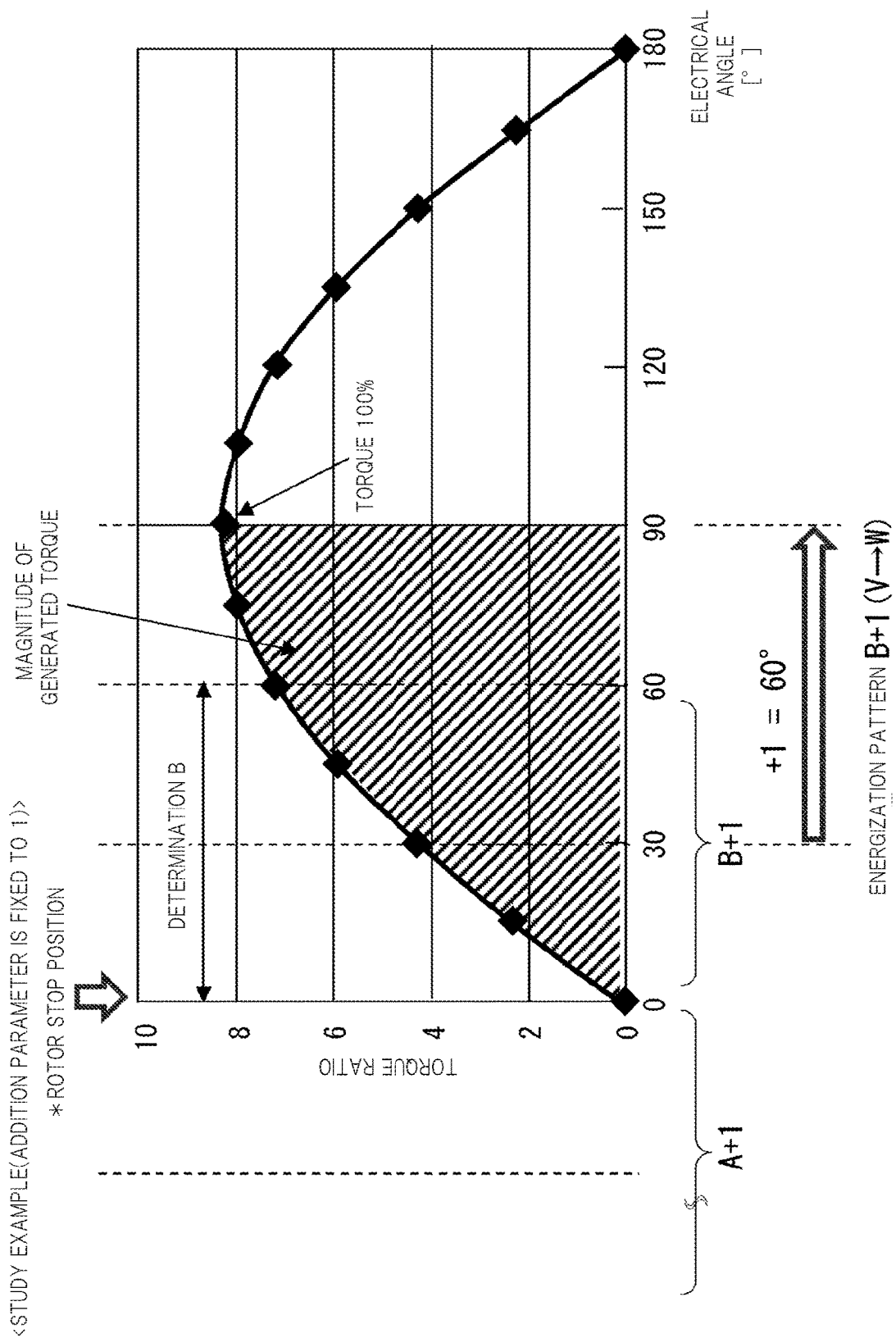
FIG. 11B is a graph illustrating a relationship between an energization pattern and a generated torque with respect to a detected position of the rotor of the brushless DC motor in the study example.

FIGS. 10A and 10B illustrate the torque generated in the motor when the addition parameter is fixed to "2" in the study example. FIGS. 11A and 11B illustrate the torque generated in the motor when the addition parameter is fixed to "1" in the study example. FIGS. 10A, 10B, 11A, and 11B illustrate the magnitude of the generated torque (torque ratio) with respect to the electrical angle (the position of the rotor) of the motor. FIGS. 10A, 10B, 11A, and 11B illustrate general torque curves, and the torque amount is 0 at an electrical angle of 0° while the torque amount is maximized at an electrical angle of 90°. FIGS. 10A and 11A illustrate the generated torque if the basic energization pattern is set to the energization pattern A that is behind an electrical angle of 0° because of the rotor stop position detection although the stop position of the rotor of the IPM motor is set to the electrical angle of 0°. FIGS. 10B and 11B illustrate the generated torque if the basic energization pattern is set to the energization pattern B that is ahead of the electrical angle of 0° because of the rotor stop position detection although the stop position of the rotor of the IPM motor is set to the electrical angle of 0°.

First, in the study example in which the addition parameter is fixed to "2", as illustrated in FIG. 10A, the addition parameter of the fixed value "2" (60°+60°) is added if the basic energization pattern is the energization pattern A based on the rotor stop position (for example, −30°) detected in accordance with the largest interphase current difference. Then, the startup torque is applied in accordance with the startup energization pattern C (from the V phase to the W phase). As a result, the maximum torque (100%) is generated in the motor at an electrical angle of 90°. In this case, if the rotor stops at −30°, the rotor moves by 120° and stops. However, since the rotor is shifted by 30° from a position where the rotor is excited by the flow of the current in accordance with the energization pattern, the movement amount of the rotor of the IPM motor is 90°.

As illustrated in FIG. 10B, the addition parameter of the fixed value "2" (60°+60°) is added if the basic energization pattern is the energization pattern B based on the rotor stop position (for example, +30°) detected in accordance with the largest interphase current difference. Then, the startup torque is applied in accordance with the startup energization pattern D (from the V phase to the U phase). As a result, the torque of 50% of the maximum torque is generated in the motor at an electrical anole of 150°.

Next, in the study example in which the addition parameter is fixed to "1", as illustrated in FIG. 11A, the addition parameter of the fixed value "1" (60°) is added if the basic energization pattern is the energization pattern A based on the rotor stop position (for example, −30°) detected in accordance with the largest interphase current difference. Then, the startup torque is applied in accordance with the startup energization pattern B (from the U phase to the W phase). As a result, the torque of 50% of the maximum torque is generated in the motor at an electrical angle of 30°.

As illustrated in FIG. 11B, the addition parameter of the fixed value "1" (60°) is added if the basic energization pattern is the energization pattern B based on the rotor stop position (for example, +30°) detected in accordance with the largest interphase current difference. Then, the startup torque is applied in accordance with the startup energization pattern C (from the V phase to the W phase). As a result, the maximum torque (100%) is generated in the motor at an electrical angle of 90°.

As described above, in the study example, when the addition parameter is fixed to "2" or "1", only 50% of the maximum torque can be obtained in a case of FIGS. 10B and 11A. In particular, since the IPM motor corresponds to the case of FIG. 10B or FIG. 11A due to the influence of the cogging torque, a sufficient torque cannot be generated in the study example. For example, if the rotor is stopped near an electrical angle of 150° in the example illustrated in FIG. 9, the case of FIG. 10B or 11A is applied, and thus, the torque of 50% is obtained.

On the other hand, in the sensor-equipped motor, a Hall signal of the Hall sensor has a phase shifted by 30° from the position detection of the study example. Therefore, if the torque is measured with the same motor, the torque in the study example is inferior to that of the sensor-equipped motor depending on the rotor stop position. That is, the position detection in the study example shifts by an electrical angle of 30° from that of the sensor-equipped motor. Therefore, particularly in a system such as the IPM motor that requires a torque, the shift appears as torque fluctuation, and only a torque lower than that of the sensor-equipped motor can be generated.

Figure 12:
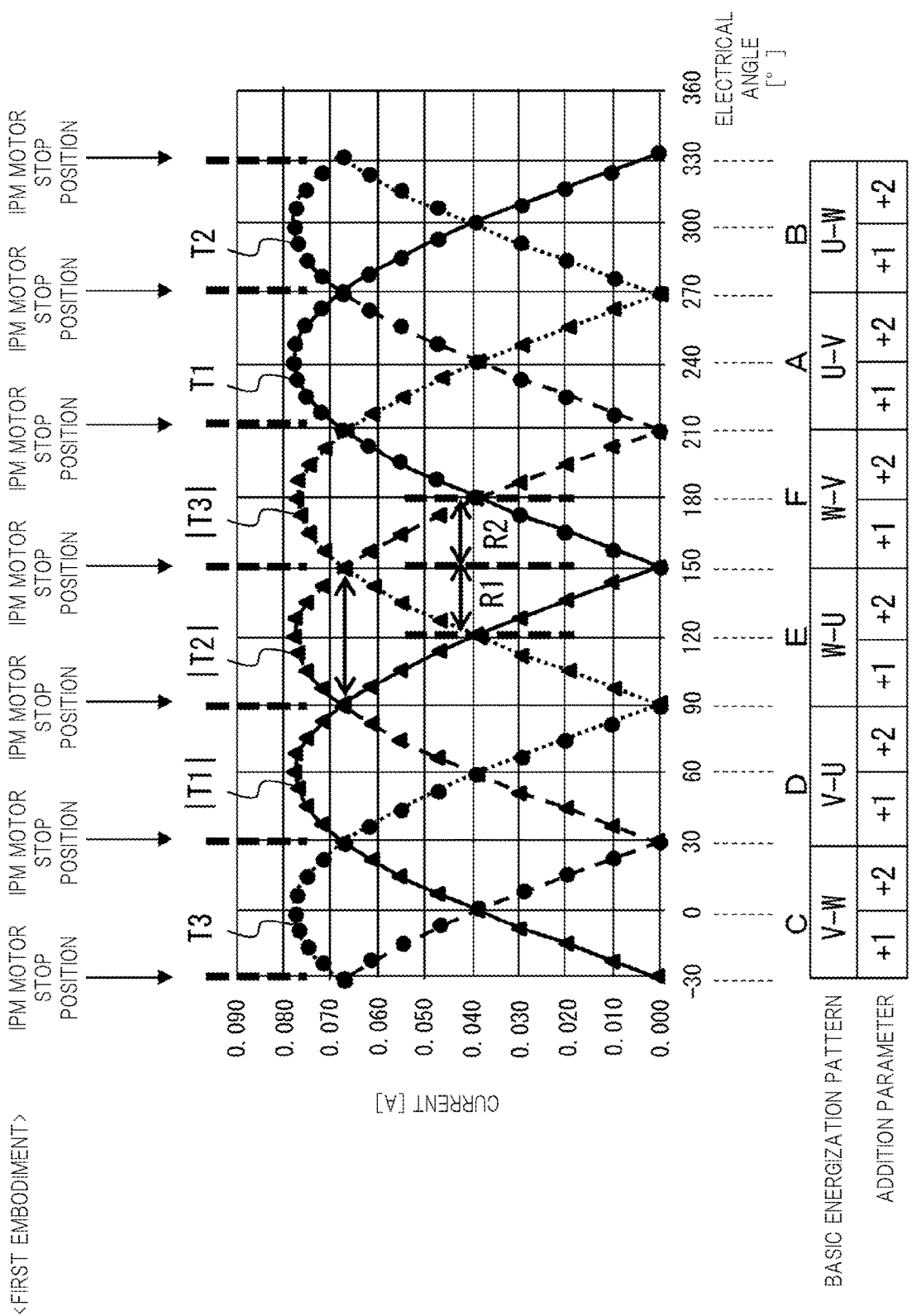
FIG. 12 is a diagram illustrating a relationship among an interphase current difference and an electrical angle of the brushless DC motor according to the first embodiment, a basic energization pattern, and an addition parameter.

On the other hand, in the present embodiment, the startup energization pattern is determined using the magnitude relationship among the interphase current differences T1, T2, and T3 as described above. FIG. 12 illustrates a relationship among the interphase current differences T1, T2, and T3 and the electrical angle, the basic energization pattern and the addition parameter obtained from the interphase current differences in the present embodiment.

As illustrated in FIG. 12, the transition of the interphase current differences T1, T2, and T3 with respect to the electrical angle is similar to that in the study example, and the basic energization pattern corresponding to the detected position (electrical angle) is also similar to that in the study example. On the other hand, in the present embodiment, as different from the study example, the addition parameter is selected using the magnitude relationship among the interphase current differences T1, T2, and T3.

That is, in the present embodiment, the position of the rotor is detected in a range of an electrical angle of 60° by selecting the largest interphase current difference among the interphase current differences T1, T2, and T3 obtained from the wave detection currents, and then, comparing the magnitudes of two wave detection currents, from which the selected interphase current difference is calculated, and the basic energization pattern is calculated from the detected position. Next, in the present embodiment, the addition parameter (+1 or +2) corresponding to a range of an electrical angle of 30° is selected by comparing the magnitudes of the other two interphase current differences with each other, and the selected addition parameter is added to the basic energization pattern to obtain the startup energization pattern at the time of the kicking.

For example, if the interphase current difference |T2| is the largest current difference while the wave detection current IE is larger than the wave detection current IB, in the present embodiment, as similar to the study example, it is detected that the rotor is stopped between an electrical angle of 90° and an electrical angle of 150°, and the energization pattern E (POSI=P4) is obtained as the basic energization pattern from the detected position.

Furthermore, in the present embodiment, "1" or "2" is selected as the addition parameter, based on the magnitude relationship between the other interphase current differences T1 and |T3|. If |T1|>|T3|, the corresponding addition parameter "1" is selected, the addition parameter "1" is added to the basic energization pattern F (POSI=P4), and the startup energization pattern at the time of the kicking is set to the energization pattern F (POSI=P5). If |T1|<|T3|, the corresponding addition parameter "2" selected, the addition parameter "2" is added to the basic energization pattern E (POSI=P4), and the startup energization pattern at the time of the kicking is set to the energization pattern A (POSI=P0).

As described above, in the present embodiment, in addition to the largest interphase current difference, the other two interphase current differences are also used to obtain the addition parameter corresponding to each electrical angle of 30° of a resolution that is twice that of the study example. For example, if the rotor is stopped near an electrical angle of 150°, the values |T2| and |T3| are approximated. In the present embodiment, "2" is set as the addition parameter if the rotor is stopped between 120° and 150° (a range R1 in FIG. 12), and "1" is set as the addition parameter if the rotor is stopped between 150° and 180° (a range R2 in FIG. 12). Therefore, the startup torque can be applied in accordance with a more appropriate startup energization pattern than that of the study example, and a desired torque can be obtained. Specifically, the torque generated in the motor in the present embodiment is as illustrated in FIGS. 13A and 13B.

Figure 13B:
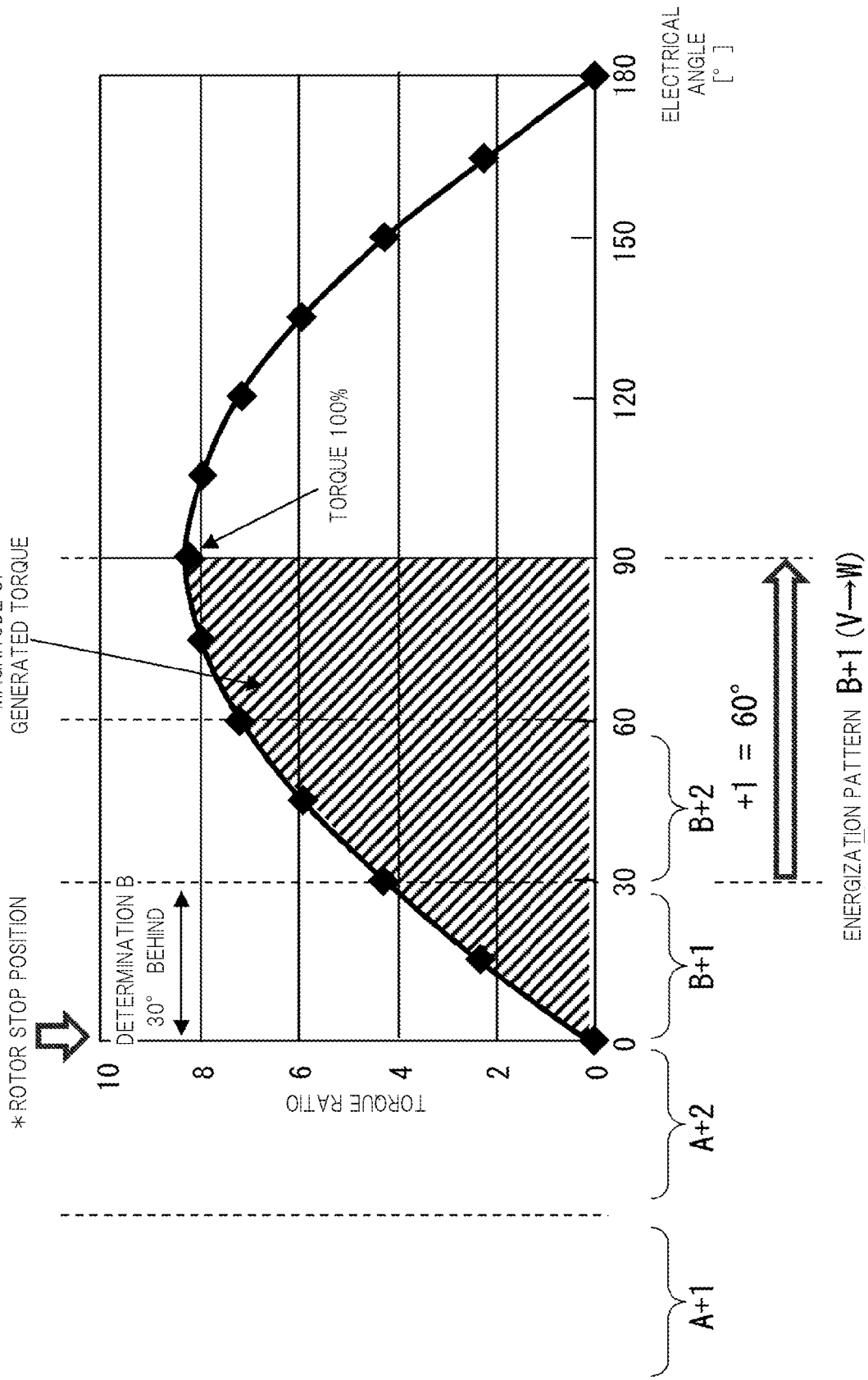
FIG. 13B is a graph illustrating a relationship between an energization pattern and a generated torque with respect to a detected position of the rotor of the brushless DC motor according to the first embodiment.

FIGS. 13A and 13B illustrate the torque generated in the motor when the addition parameter is variable in the present embodiment. As similar to FIGS. 10A, 10B, 1A, and 11B, FIGS. 13A and 13B illustrate the magnitude (torque ratio) of the generated torque with respect to the electrical angle of the motor (the position of the rotor). As similar to FIGS. 10A and 11A, FIG. 13A illustrates the generated torque if the basic energization pattern is set to the energization pattern A that is behind an electrical angle of 0° because of the rotor stop position detection although the stop position of the rotor of the IPM motor is set to the electrical angle of 0°. As similar to FIGS. 10B and 11B, FIG. 13B illustrates the generated torque if the basic energization pattern is set to the energization pattern B that is ahead of the electrical angle of 0° because of the rotor stop position detection although the stop position of the rotor of the IPM motor is set to the electrical anole of 0°.

In the present embodiment, as illustrated in FIG. 13A, the addition parameter "2" (60°+60°) that is selected from the comparison result of the other interphase current differences is added if the basic energization pattern is the energization pattern A based on the rotor stop position (for example, −30°) detected in accordance with the largest interphase current difference. Then, the startup torque is applied in accordance with the startup energization pattern C (from the V phase to the W phase). As a result, the maximum torque (100%) is generated in the motor at an electrical angle of 90°.

As illustrated in FIG. 13B, the addition parameter "1" (60°) that is selected from the comparison result of the other interphase current differences is added if the basic energization pattern is the energization pattern B based on the rotor stop position (for example, +30°) detected in accordance with the largest interphase current difference. Then, the startup torque is applied in accordance with the startup energization pattern C (from the V phase to the W phase). As a result, the maximum torque (100%) is generated in the motor at an electrical angle of 90°.

As described above, in the present embodiment, since the addition parameter that is to be variable and correspond to the detected stop position is selected, the maximum torque can be obtained even in both FIGS. 13A and 13B. In particular, even if the IPM motor is in the case of either FIG.

13A or FIG. 13B due to the influence of the cogging torque, the torque of 100% can be always generated by the present embodiment. For example, if the rotor is stopped near an electrical angle of 150° in the example illustrated in FIG. 12, the case of FIG. 13A or 13B is observed, and the torque of 100% is obtained. Therefore, the present embodiment can provide a higher torque than that of the study example, and can generate a torque equivalent to that of the sensor-equipped motor even in the case of the sensorless IPM motor. Note that the present embodiment can similarly provide a higher torque than that of the study example even in the case of the SPM motor or another motor.

Note that the above-described program can be stored using various types of non-transitory computer readable media, and can be loaded to a computer. The non-transitory computer readable media include various types of tangible storage media. Examples or the non-transitory computer readable media include a magnetic recording medium (for example, a flexible disk, a magnetic tape, or a hard disk drive), a magnetooptical recording medium (for example, a magnetooptical disk), a CD-ROM (Read Only Memory), a CD-R, a CD-R/W, and a semiconductor memory (for example, a mask ROM, a PROM (programmable ROM), an EPROM (erasable PROM), a flash ROM, and a RAM (Random Access Memory)). In addition, the program may be loaded to the computer by various types of transitory computer readable media. Examples of the transitory computer readable media include an electrical signal, an optical signal, and electromagnetic waves. By the transitory computer readable medium, the program can be loaded to the computer via a wired communication path such as a cable and an optical fiber, or a wireless communication path.

In the foregoing, the invention made by the present inventors has been concretely described on the basis of the embodiments. However, it is needless to say that the present invention is not limited to the foregoing embodiments, and various modifications can be made within the scope of the present invention.

What is claimed is:

1. A semiconductor device for controlling a drive circuit configured to drive a three-phase motor, the semiconductor device comprising:
   a current detection circuit configured to detect a current flowing through the three-phase motor by driving of the drive circuit; and
   a controller configured to control the drive circuit, based on the detected current,
   wherein the three-phase motor has a first phase, a second phase, and a third phase,
   wherein the controller is configured to:
      control, when the three-phase motor is stationary, the drive circuit to sequentially energize two of the first phase, the second phase and the third phase to create an energization pattern of a set of wave detection currents that sequentially flows in a first direction from the drive circuit to a first interphase between the first phase and the second phase, a second interphase between the second phase and the third phase, a third interphase between the third phase and the first phase, then in a second direction from the first interphase, the third interphase, and the second interphase;
      obtain, from the set of wave detection currents detected by the current detection circuit, a first interphase current difference, a second interphase current difference, and a third interphase current difference, wherein:
         the first interphase current difference is a difference between wave detection currents in the first direction and the second direction in the first interphase;
         the second interphase current difference is a difference between wave detection currents in the first direction and the second direction in the second interphase; and
         the third interphase current difference is a difference between wave detection currents in the first direction and the second direction in the third interphase; and
      determine an initial energization pattern used in initial driving of the three-phase motor, based on a magnitude relationship among the first interphase current difference, the second interphase current difference, and the third interphase current difference,
   wherein the set of wave detection currents comprises:
      a first current that flows in the first direction from the first phase to the second phase; a second current that flows in the first direction from the first phase to the third phase;
      a third current that flows in the first direction from the second phase to the third phase;
      a fourth current that flows in the second direction from the second phase to the first phase;
      a fifth current that flows in the second direction from the third phase to the first phase; and
      a sixth current that flows in the second direction from the third phase to the second phase, wherein the current detection circuit is configured to detect the first to sixth currents, and
   wherein the first interphase current difference is a difference between the first current and the fourth current, the second interphase current difference is a difference between the second current and the fifth current, and the third interphase current difference is a difference between the third current and the sixth current,
   wherein the controller is configured to:
      detect a position of a rotor of the three-phase motor, based on a largest interphase current difference among the first interphase current difference, the second interphase current difference, and the third interphase current difference; and
      determine the initial energization pattern used in the initial driving with reference to the detected position of the rotor as a basic position, and
   wherein the controller is configured to:
      determine an addition parameter to be added to the basic position, based on the magnitude relationship among the first interphase current difference, the second interphase current difference, and the third interphase current difference; and
      determine the energization pattern used in the initial driving, based on a result of adding the addition parameter.

2. The semiconductor device according to claim 1, wherein the controller determines the addition parameter, based on a magnitude relationship between two interphase current differences other than a largest interphase current difference among the first interphase current difference, the second interphase current difference, and the third interphase current difference.

3. The semiconductor device according to claim 1, wherein the addition parameter corresponds to an electrical angle of the three-phase motor.

4. A motor drive system comprising:
a three-phase motor configured to have a first phase, a second phase, and a third phase;
a drive circuit configured to drive the three-phase motor; and
a semiconductor device for controlling the drive circuit, wherein the semiconductor device includes:
- a current detection circuit configured to detect a current flowing through the three-phase motor by driving of the drive circuit; and
- a controller configured to control the drive circuit, based on the detected current, wherein the controller is configured to
control, when the three-phase motor is stationary, the drive circuit to sequentially energize two of the first phase, the second phase and the third phase to create an energization pattern of a set of wave detection currents that sequentially flows in a first direction from the drive circuit to a first interphase between the first phase and the second phase, a second interphase between the second phase and the third phase, and a third interphase between the third phase and the first phase, then in a second direction from the first interphase, the third interphase, and the second interphase,
obtain, from the set of wave detection currents detected by the current detection circuit, a first interphase current difference, a second interphase current difference, and a third interphase current difference, wherein:
- the first interphase current difference is a difference between wave detection currents in the first direction and the second direction in the first interphase;
- the second interphase current difference is a difference between wave detection currents in the first direction and the second direction in the second interphase; and
- the third interphase current difference is a difference between wave detection currents in the first direction and the second direction in the third interphase; and
determine an initial energization pattern used in initial driving of the three-phase motor, based on a magnitude relationship among the first interphase current difference, the second interphase current difference, and the third interphase current difference,
wherein the set of wave detection currents comprises:
- a first current that flows in the first direction from the first phase to the second phase; a second current that flows in the first direction from the first phase to the third phase;
- a third current that flows in the first direction from the second phase to the third phase;
- a fourth current that flows in the second direction from the second phase to the first phase;
- a fifth current that flows in the second direction from the third phase to the first phase; and
- a sixth current that flows in the second direction from the third phase to the second phase, wherein the current detection circuit is configured to detect the first to sixth currents, and
wherein the first interphase current difference is a difference between the first current and the fourth current, the second interphase current difference is a difference between the second current and the fifth current, and the third interphase current difference is a difference between the third current and the sixth current, wherein the controller is configured to:
detect a position of a rotor of the three-phase motor, based on a largest interphase current difference among the first interphase current difference, the second interphase current difference, and the third interphase current difference; and
determine the initial energization pattern used in the initial driving with reference to the detected position of the rotor as a basic position, and
wherein the controller is configured to:
determine an addition parameter to be added to the basic position, based on the magnitude relationship among the first interphase current difference, the second interphase current difference, and the third interphase current difference; and
determine the energization pattern used in the initial driving, based on a result of adding the addition parameter.

5. A control method for controlling a drive circuit configured to drive a three-phase motor, the control method comprising:
detecting, by a current detection circuit, a current flowing through the three-phase motor by driving of the drive circuit; and
controlling, by a controller, the drive circuit based on the detected current,
wherein the three-phase motor has a first phase, a second phase, and a third phase,
wherein the control method further comprises:
controlling, by the controller, when the three-phase motor is stationary, the drive circuit to sequentially energize two of the first phase, the second phase and the third phase to create an energization pattern of a set of wave detection currents that sequentially flows in a first direction from the drive circuit to a first interphase between the first phase and the second phase, a second interphase between the second phase and the third phase, a third interphase between the third phase and the first phase, then in a second direction from the first interphase, the third interphase, and the second interphase;
obtaining, by the controller, from the set of wave detection currents detected by the current detection circuit, a first interphase current difference, a second interphase current difference, and a third interphase current difference, wherein:
- the first interphase current difference is a difference between wave detection currents in the first direction and the second direction in the first interphase;
- the second interphase current difference is a difference between wave detection currents in the first direction and the second direction in the second interphase; and
- the third interphase current difference is a difference between wave detection currents in the first direction and the second direction in the third interphase; and
determining, by the controller, an initial energization pattern used in initial driving of the three-phase motor, based on a magnitude relationship among the first interphase current difference, the second interphase current difference, and the third interphase current difference, wherein the set of wave detection currents comprises:
a first current that flows in the first direction from the first phase to the second phase; a second current that flows in the first direction from the first phase to the third phase;
a third current that flows in the first direction from the second phase to the third phase;
a fourth current that flows in the second direction from the second phase to the first phase;
a fifth current that flows in the second direction from the third phase to the first phase; and
a sixth current that flows in the second direction from the third phase to the second phase, wherein the current detection circuit is configured to detect the first to sixth currents, and
wherein the first interphase current difference is a difference between the first current and the fourth current, the second interphase current difference is a difference between the second current and the fifth current, and the third interphase current difference is a difference between the third current and the sixth current, wherein the control method further comprises:
detecting, by the controller, a position of a rotor of the three-phase motor, based on a largest interphase current difference among the first interphase current difference, the second interphase current difference, and the third interphase current difference; and
determining, by the controller, the initial energization pattern used in the initial driving with reference to the detected position of the rotor as a basic position, and wherein the control method further comprises:
determining, by the controller, an addition parameter to be added to the basic position, based on the magnitude relationship among the first interphase current difference, the second interphase current difference, and the third interphase current difference; and
determining, by the controller, the energization pattern used in the initial driving, based on a result of adding the addition parameter.

* * * * *